US010877889B2

(12) United States Patent
Roberts

(10) Patent No.: US 10,877,889 B2
(45) Date of Patent: Dec. 29, 2020

(54) PROCESSOR-SIDE TRANSACTION CONTEXT MEMORY INTERFACE SYSTEMS AND METHODS

(71) Applicant: Micron Technology, Inc., Boise, ID (US)

(72) Inventor: David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 71 days.

(21) Appl. No.: 16/414,485

(22) Filed: May 16, 2019

(65) Prior Publication Data

US 2020/0364146 A1 Nov. 19, 2020

(51) Int. Cl.
*G06F 12/08* (2016.01)
*G06F 12/0815* (2016.01)
(Continued)

(52) U.S. Cl.
CPC ...... *G06F 12/0815* (2013.01); *G06F 12/0862* (2013.01); *G06F 12/10* (2013.01); *G06F 2212/602* (2013.01); *G06F 2212/657* (2013.01)

(58) Field of Classification Search
CPC combination set(s) only.
See application file for complete search history.

(56) References Cited

U.S. PATENT DOCUMENTS 6,173,392 B1 * 1/2001 Shinozaki ............... G06F 9/383
  711/213
6,938,132 B1  8/2005 Joffe et al.
(Continued)

FOREIGN PATENT DOCUMENTS

WO 2017184497 A1 10/2017

OTHER PUBLICATIONS

C. Ortega, V. Garcia, M. Moreto, M. Casas and R. Rusitoru, "Data Prefetching on In-order Processors," 2018 International Conference on High Performance Computing & Simulation (HPCS), Orleans, 2018, pp. 322-329, doi: 10.1109/HPCS.2018.00061. (Year: 2018).*
(Continued)

*Primary Examiner* — Khoa D Doan
(74) *Attorney, Agent, or Firm* — Fletcher Yoder, P.C.

(57) ABSTRACT

Techniques for implementing and/or operating an apparatus, which includes a processing system communicatively coupled to a memory system via a memory bus. The processing system includes processing circuitry, one or more caches, and a memory controller. When a data block targeted by the processing circuitry results in a processor-side miss, the memory controller instructs the processing system to output a memory access request that requests return of the data block at least in part by outputting an access parameter to be used by the memory system to locate the data block in one or more hierarchical memory levels during a first clock cycle and outputting a context parameter indicative of context information associated with current targeting of the data block during a second clock cycle different from the first clock cycle to enable the memory system to predictively control data storage based at least in part on the context information.

19 Claims, 10 Drawing Sheets

(51) Int. Cl.
    *G06F 12/0862*    (2016.01)
    *G06F 12/10*      (2016.01)

(56) References Cited

U.S. PATENT DOCUMENTS

| | | | | |
|---|---|---|---|---|
| 7,162,567 | B2* | 1/2007 | Jeddeloh | G06F 12/0215 |
| | | | | 711/105 |
| 7,430,650 | B1* | 9/2008 | Ross | G06F 12/0862 |
| | | | | 711/137 |
| 9,286,221 | B1* | 3/2016 | Sundararajan | G11C 7/1072 |
| 9,767,028 | B2 | 9/2017 | Cheng et al. | |
| 9,934,148 | B2 | 4/2018 | Roberts et al. | |
| 2001/0049772 | A1* | 12/2001 | Choi | G06F 12/0882 |
| | | | | 711/138 |
| 2007/0067382 | A1 | 3/2007 | Sun | |
| 2012/0054425 | A1 | 3/2012 | Matas | |
| 2016/0048452 | A1* | 2/2016 | Gill | G06F 12/0811 |
| | | | | 711/122 |
| 2016/0203081 | A1 | 7/2016 | Kimura | |
| 2017/0353576 | A1* | 12/2017 | Guim Bernat | G06F 12/0862 |

OTHER PUBLICATIONS

Kyle J. Nesbit et al., AC/DC: An Adaptive Data Cache Prefetcher, University of Wisconsin-Madison Department of Electrical and Computer Engineering, 11 pages.

Leeor Peled et al., Semantic Locality and Context-based Prefetching Using Reinforcement Learning, Technion—Israel Institute of Technology, 13 pages, 2015.

Akanksha Jain et al., Back to the Future: Leveraging Belady's Algorithm for Improved Cache Replacement, Department of Computer Science the University of Texas, 12 pages.

Samira Khan et al., 2010 43rd Annual IEEE/ACM International Symposium on Microarchitecture, Sampling Dead Block Prediction for Last-Level Caches, ☐Department of Computer Science University of Texas, 12 pages.

Sushant Kondguli et al., 2018 ACM/IEEE 45th Annual International Symposium on Computer Architecture, Division of Labor: A More Effective Approach to Prefetching, Dept. of Electrical and Computer Engineering University of Rochester, 13 pages.

International Search Report and Written Opinion for PCT Application No. PCT/US2020/028939 dated Jul. 30, 2020.

* cited by examiner

PROCESSOR-SIDE TRANSACTION CONTEXT MEMORY INTERFACE SYSTEMS AND METHODS

BACKGROUND

The present disclosure generally relates to computing systems and, more particularly, to memory interfaces implemented in computing systems.

Generally, a computing system includes a processing sub-system and a memory sub-system, which may store data accessible to processing circuitry of the processing sub-system. For example, to perform an operation, the processing circuitry may execute corresponding instructions retrieved from a memory device implemented in the memory sub-system. In some instances, data input to the operation may also be retrieved from the memory device. Additionally or alternatively, data output (e.g., resulting) from the operation may be stored in the memory device, for example, to enable subsequent retrieval. However, at least in some instances, operational efficiency of a computing system may be limited by its architecture, for example, which governs the sequence of operations performed in the computing system.

BRIEF DESCRIPTION OF THE DRAWINGS

Various aspects of the present disclosure may be better understood upon reading the following detailed description and upon reference to the drawings in which.

DETAILED DESCRIPTION

Figure 1:
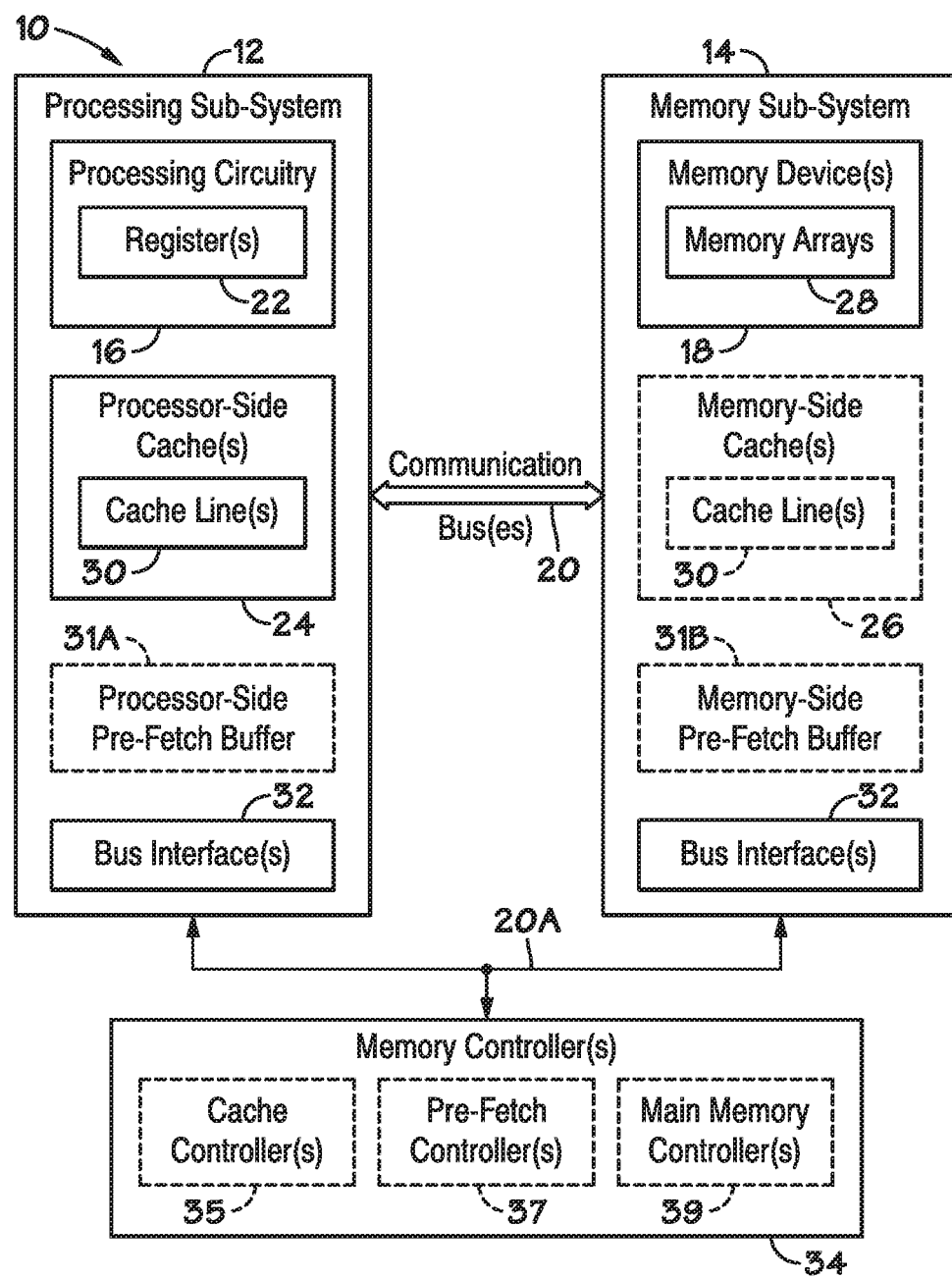
FIG. 1 is a block diagram of a computing system that includes a processing sub-system and a memory sub-system, in accordance with an embodiment of the present disclosure.

The present disclosure provides techniques that facilitate improving operational efficiency of computing systems, for example, by mitigating architectural features that may otherwise limit operational efficiency. Generally, a computing system may include various sub-systems, such as a processing sub-system and/or a memory sub-system. In particular, the processing sub-system may include processing circuitry, for example, implemented in one or more processors and/or one or more processor cores. The memory sub-system may include one or more memory devices (e.g., chips or integrated circuits), for example, implemented on a memory module, such as a dual in-line memory module (DIMM), and/or organized to implement one or more memory arrays (e.g., array of memory cells).

Generally, during operation of a computing system, processing circuitry implemented in its processing sub-system may perform various operations by executing corresponding instructions currently stored in one or more of its registers. For example, when an application (e.g., program) is running in the computing system, the processing circuitry may execute an application instruction that performs a data processing operation on input data. At least in some instances, data accessible to the processing circuitry in the processing sub-system may be stored in one or more memory devices of a memory sub-system in the computing system. For example, the memory sub-system may store the data input to the operation, the data output (e.g., resulting) from the operation, and/or data indicating the executable application instructions via a memory array implemented in one or more of its memory devices. In other words, during operation of the computing system, the processing sub-system may access the memory sub-system, for example, to store (e.g., write) data to the memory sub-system and/or to retrieve (e.g., read) data previously stored in the memory sub-system.

To enable access to a memory sub-system, a processing sub-system may be communicatively coupled to the memory sub-system via one or more communication buses, such as a memory bus and/or a communication (e.g., Ethernet) network. Additionally, to access the memory sub-system, in some instances, the processing sub-system may output a memory access request, which indicates one or more access parameters to be used by the memory sub-system to provide the processing sub-system memory access. For example, to store (e.g., write) a data block to the memory sub-system, the processing sub-system may output a write memory access request that indicates one or more write access parameters, such as a virtual memory address used by processing circuitry to identify the data block, a physical memory address in the memory sub-system at which the data block is to be stored, size (e.g., bit count) of the data block, and/or a write access indicator (e.g., bit). Additionally or alternatively, to retrieve (e.g., read) a data block from the memory sub-system, the processing sub-system may output a read memory access request that indicates read access parameters, such as a virtual memory address used by processing circuitry to identify the data block, a physical memory address in the memory sub-system at which the data block is expected to be stored, size (e.g., bit depth or bit length) of the data block, and/or a read access indicator (e.g., bit).

In response to receipt of a read memory access request, the memory sub-system may search for a data block targeted by the read memory access request based at least in part on the read access parameters indicated therein. For example, the memory sub-system may determine a target value of a tag parameter (e.g., metadata) expected to be associated with the target data block based at least in part on a virtual memory address and/or a physical memory address indicated in the read memory access request. The memory sub-system may then identify (e.g., find) the target data block by successively comparing the target tag parameter value against the value of tag parameters associated with valid data blocks stored therein. Once a match is detected, the memory sub-system may identify an associated data block as the target data block and, thus, return the associated data block to the processing sub-system, for example, for processing and/or execution by its processing circuitry. Accordingly, at least in some instances, operational efficiency of a computing system may be dependent on data retrieval latency (e.g., duration before target data is returned) provided by its memory sub-system.

However, data communication between different computing sub-systems is generally slower than data communication within a computing sub-system, for example, due to differences in operational timing (e.g., clock domains) of the different computing sub-systems, the data buses coupled between the different sub-systems being shared with other computing sub-systems, and/or communication distance between the different sub-systems. In other words, data communication within (e.g., internal to) the processing sub-system may be faster than data communication between the processing sub-system and the memory sub-system. Thus, to facilitate improving (e.g., reducing or shortening) data retrieval latency, one or more caches may be implemented in the processing sub-system. For example, the processing sub-system may include a level one (L1) cache, a level two (L2) cache, and/or a level three (L3) cache integrated with its processing circuitry.

More specifically, in some instances, a cache may be implemented and/or operated to store (e.g., cache) data output from the processing circuitry, data requested (e.g., input to and/or targeted) by the processing circuitry, and/or data pre-fetched from a memory array in the memory sub-system. Additionally or alternatively, a computing system may include one or more buffers, such as a pre-fetch buffer, distinct (e.g., separate) from the caches implemented in the computing system. In some instances, a pre-fetch buffer may be implemented and/or operated to store (e.g., buffer) data pre-fetched from a memory array. In fact, to facilitate reducing cache pollution, in some instances, the computing system may retain storage of pre-fetched data in the pre-fetch buffer, for example, instead of transferring the pre-fetched data to a cache.

To facilitate further improving (e.g., reducing or shortening) data retrieval latency, in some instances, total storage capacity of a memory sub-system may be distributed across multiple hierarchical memory levels (e.g., layers). Generally, a hierarchical memory sub-system may include a lowest (e.g., first) memory level closest to the processing circuitry and a highest (e.g., last) memory level farthest from the processing circuitry. Additionally, in some instances, the hierarchical memory sub-system may include one or more intermediate memory levels between the lowest memory level and the highest memory level. In other words, an intermediate memory level may be implemented farther from the processing circuitry compared to the lowest memory level and closer to the processing circuitry compared to the highest memory level.

Generally, hierarchical memory levels may be implemented such that lower memory levels provide faster data access (e.g., read and/or write) speed compared to higher memory levels, for example, at least in part by implementing a lower memory level with less (e.g., smaller) storage capacity compared to a higher memory level. As such, to facilitate improving data retrieval latency when data is targeted (e.g., requested), a computing system may attempt to retrieve the target data from the lowest hierarchical memory level before successively progressing to higher memory levels if the target data results in a miss (e.g., target tag parameter value does not match any valid tag parameter values). For example, the computing system may check whether a target data block is currently stored in the lowest (e.g., first) memory level. When the target data block results in a miss in the lowest memory level, the computing system may then check whether the target data block is currently stored in the next lowest (e.g., second) memory level, and so on.

Moreover, in some instances, when target data is not currently stored in a lower memory level, the computing system may store (e.g., cache and/or buffer) a copy (e.g., instance) of the target data in the lower memory level after retrieval from a higher memory level. In fact, at least in some instances, missing a lower memory level may actually result in slower (e.g., higher) data retrieval latency compared to directly retrieving the target data from a higher memory level. In other words, the effect on data retrieval latency and, thus, computing system operational efficiency resulting from implementing multiple hierarchical memory levels may largely be dependent on the memory level at which data is stored when the data is actually targeted.

Accordingly, to facilitate improving computing system operational efficiency, the present disclosure provides techniques for implementing and/or operating a computing system to reduce likelihood of data targeted by its processing circuitry missing a lower memory level (e.g., layer). In some embodiments, the computing system may treat caches and/or buffers implemented in its processing sub-system as one or more lower memory levels compared to a memory level implemented by a memory array in its memory sub-system. For example, a first (e.g., L1) cache in the processing sub-system may be treated as the lowest memory level, a second (e.g., L2) cache in the processing sub-system may be treated as the next lowest memory level, and so on. Additionally or alternatively, when a computing system is implemented and/or operated to retain storage of pre-fetched data in a pre-fetch buffer, a cache in the processing sub-system may be treated as a lower memory level and a pre-fetch buffer may be treated as a higher memory level.

In some embodiments, the computing system may additionally include one or more caches and/or buffers, such as a pre-fetch buffer, implemented in its memory sub-system. In other words, in such embodiments, the computing system may include one or more processor-side caches as well as one or more memory-side caches, which are implemented to provide a higher memory level compared to the one or more processor-side caches. Additionally or alternatively, the computing system may include a processor-side pre-fetch buffer as well as a memory-side pre-fetch buffer, which is implemented provide a higher memory level compared to the processor-side pre-fetch buffer. Furthermore, in some embodiments, one or more memory arrays in the memory sub-system may be implemented to provide a higher memory level compared to a (e.g., processor-side and/or memory-side) cache memory level and/or a (e.g., processor-side and/or memory-side) pre-fetch memory level. For example, the memory sub-system may include a non-volatile memory array implemented to provide a highest memory level and a volatile memory array, such as a dynamic random-access memory (DRAM) array, implemented to provide a next highest memory level.

To facilitate reducing likelihood of missing a lower memory level, in some embodiments, the computing system may include one or more memory controllers implemented and/or operated to control data storage therein. For example, the computing system may include a first (e.g., processor-side) memory controller that controls data storage in its processing sub-system and a second (e.g., memory-side) memory controller that controls data storage in its memory sub-system. In other words, as used herein, a "memory controller" is intended to describe a controller (e.g., control circuitry and/or control logic) implemented and/or operated to control data storage in a computing system. In fact, in some embodiments, a memory controller may be implemented using multiple controllers, such as a cache controller that controls data storage in a cache memory level, a pre-fetch controller that controls data storage in a pre-fetch memory level, and/or a DRAM (e.g., main) memory controller that controls data storage in a DRAM memory level.

To facilitate reducing likelihood of missing a lower memory level, in some embodiments, a memory controller may predictively control data storage in one or more hierarchical memory levels. In other words, at least in such embodiments, the memory controller may predict a data access pattern expected to occur over an upcoming control horizon (e.g., time period or one or more clock cycles) and control data storage in one or more hierarchical memory levels accordingly. In fact, since processing circuitry often exhibits somewhat cyclical (e.g., repetitive) data access patterns, in some embodiments, a memory controller may predict a subsequent data access pattern based at least in part on one or more previous (e.g., historical) data access patterns.

In some embodiments, a memory controller may determine a previous data access pattern by determining what data was previously accessed (e.g., targeted and/or requested), when the data was previously accessed, and/or an order with which the data was previously accessed. Thus, to facilitate determining a previous data access pattern, in some embodiments, the memory controller may historically track access information (e.g., parameters) associated with data (e.g., memory) accesses, for example, via entries in a historical data access information table. As an illustrative example, when a first data block is accessed (e.g., targeted and/or written), the memory controller may store a first block identifier parameter (e.g., corresponding tag parameter, physical memory address, or virtual memory address) that identifies the first data block in a block identifier field of a first entry in the historical data access information table.

To facilitate historical tracking, in some embodiments, a memory controller may store an indication of data blocks targeted by multiple data access, for example, in chronological order via successive entries in the historical data access information table. To help illustrate, continuing with the above example, when a second data block is accessed after the first data block, the memory controller may store a second block identifier parameter that identifies the second data block in the block identifier field of a second entry in the historical data access information table. Additionally, when a third data block is accessed after the second data block, the memory controller may store a third block identifier parameter that identifies the third data block in the block identifier field of a third entry in the historical data access information table.

As such, in some embodiments, a memory controller may determine a previous data access pattern at least in part by reading entries of its historical data access information table. For example, by reading the block identifier field of entries in the historical data access information table, the memory controller may determine that the previous data access pattern accessed the first data block, the second data block, and the third data block. In other words, by read reading entries of its historical data access information table, the memory controller may determine what data blocks were accessed (e.g., targeted and/or written) by the previous data access pattern.

Additionally or alternatively, based at least in part on corresponding block identifiers indicated in the historical data access information table, the memory controller may determine a first stride length (e.g., distance) between a first (e.g., physical or virtual) memory address of the first data block and a second memory address of the second data block, a second stride length between the second memory address of the second data block and a third memory address of the third data block, and/or a third stride length between the first memory address of the first data block and the third memory address of the third data block. Furthermore, based on the order of corresponding entries in the historical data access information table, the memory controller may determine that the previous data access pattern accessed the second data block after the first data block, that the previous data access pattern accessed the third data block after the second data block, and/or that the previous data access pattern accessed the third data block after the first data block. In other words, by reading entries of its historical data access information table, the memory controller may determine relative access times of data blocks during the previous data access pattern.

In some embodiments, a memory controller may additionally track absolute access times of data blocks during a previous data access pattern. To facilitate historically tracking absolute access times, in some embodiments, historical data access information may include one or more write time parameters, which each indicates when a corresponding data block and/or a corresponding memory address was initially written (e.g., stored), and/or one or more last access time parameters, which each indicates when a corresponding data block and/or a corresponding memory address was most recently accessed (e.g., targeted and/or requested). For example, when the first data block is accessed, the memory controller may store a first last access time parameter that indicates a current time in a last access time field of the first entry in the historical data access information table. Similarly, the memory controller may store a second last access time parameter that indicates a current time in the last access time field of the second entry in the historical data access information table when the second data block is accessed and/or a third last access time parameter that indicates a current time in the last access time field of the third entry in the historical data access information table when the third data block is accessed.

Additionally or alternatively, a memory controller may track the number of times data blocks were accessed (e.g., targeted or requested) during a previous data access pattern. To facilitate historically tracking access count, in some embodiments, historical data access information may include one or more access count parameters, which each indicates the number of times a corresponding data block and/or a corresponding memory address has been accessed. For example, when the first data block is accessed, the memory controller may increment the value of a first access count parameter indicated in an access count field of the first entry in the historical data access information table. Similarly, the memory controller may increment the value of a second access count parameter indicated in the access count field of the second entry in the historical data access information table when the second data block is accessed and/or increment the value of a third access count parameter indicated in the access count field of the third entry in the historical data access information table when the third data block is accessed.

Since data access patterns are often somewhat repetitive (e.g., cyclical), in some embodiments, a memory controller may predict a subsequent data access pattern based at least in part on historical data access information associated with one or more previous data access pattern. In other words, based at least in part on the historical data access information, the memory controller may predict what data will subsequently be accessed, when the data will subsequently be accessed, and/or an order with which the data will subsequently be accessed. To help illustrate, continuing with the above example, the memory controller may predict that, since the historical data access information indicates that the first data block and the second data block were accessed by the previous data access pattern, the first data block and the second data block will again be accessed by the subsequent data access pattern. Additionally or alternatively, the memory controller may predict that, since the historical data access information indicates that the previous data access pattern access the second data block after accessing the first data block, the subsequent data access pattern will again access the second data block after accessing the first data block.

In other words, in some embodiments, a memory controller may predict a subsequent data access pattern by predicting a next target data block. For example, when the first data block is accessed, the memory controller may predict that the second data block will be accessed next. Additionally or alternatively, since the historical data access information indicates that the second memory address of the second data block is the first stride length (e.g., distance) from the first memory address of the first data block, the memory controller may predict that a next target data block is a data block associated with a (e.g., physical and/or virtual) memory address that is the first stride length from a currently or previously accessed data block.

However, at least in some instances, predicting a subsequent data access pattern based solely on chronological data access information may result in the subsequent data access pattern being improperly predicted, for example, due to historical data access information associated with an unrelated data block and/or an unrelated (e.g., virtual and/or physical) memory address being too heavily weighted in the prediction. To help illustrate, continuing with the above example, the previous targeting of the first data block and the previous targeting of the third data block may have resulted from running a specific application (e.g., program or thread) in the computing system. On the other hand, the previous targeting of the second data block may have resulted from a system interrupt independent of the specific application.

Since independent of the specific application, the system interrupt may not always occur between targeting of the first data block and targeting of the third data block. In other words, at least in some instances, the system interrupt and, thus, resulting targeting of the second data block may not occur between targeting of the first data block and targeting of the third data block by the subsequent data access pattern. Accordingly, at least in such instances, equally weighting historical data access information associated with the first data block, the second data block, and the third data block may result in the subsequent data access pattern being improperly predicted, for example, such that the predicted next target time of the third data block occurs at a time that is too late relative to its actual next target time to enable the third data block to be pre-fetched to a lower memory level before its next targeting.

To facilitate improving prediction accuracy, in some embodiments, a memory controller may predict a subsequent data access pattern at least in part by analyzing historical data access information in view of transaction context associated with one or more data (e.g., memory) accesses. In particular, in some embodiments, transaction context associated with a data access may be indicated via context information (e.g., one or more parameters) that identifies one or more aspects of the computing system associated with (e.g., that generated and/or targeted) a data block and/or a (e.g., physical and/or virtual) memory address targeted by the data access. For example, the context information may include a processor context parameter, which identifies a processor in the computing system that generated the data block, a processor in the computing system that is currently targeting the data block, and/or a processor in the computing system that previously targeted the data block.

Furthermore, in some embodiments, the context information may be indicated with varying levels of specificity. For example, the context information may additionally or alternatively include a processor core context parameter, which identifies a processor core in the processor that generated the data block, a processor core in the processor that is currently targeting the data block, and/or a processor core in the processor that previously targeted the data block. In some embodiments, the context information may additionally or alternatively include an application (e.g., program or thread) context parameter, which identifies an application that resulted in generation of the data block, an application that result in the data block currently being targeted, and/or an application that resulted in the data block previously being targeted. Additionally or alternatively, the context information may include an application instruction (e.g., program counter) context parameter, which identifies an application instruction that resulted in generation of the data block, an application instruction that resulted in the data block currently being targeted, and/or an application instruction that resulted in the data block previously being targeted.

Accordingly, in some embodiments, context information associated with one or more previous data accesses may be directly available to the processing sub-system of a computing system, for example, due to processing circuitry in the processing sub-system being the entity that generates and/or targets the data blocks stored in a computing system. Additionally, in some embodiments, a memory controller may identify different context information as being associated with different transaction contexts. In other words, in some embodiments, different transaction contexts may be associated with differing sets of context parameters, for example, which differ in the type of context parameters included, the number of context parameters included, and/or the value of one or more context parameters.

As described above, in some embodiments, the value of a context parameter associated with a data access may identify one or more aspects of a computing system associated with (e.g., that generated and/or targeted) a data block and/or a (e.g., physical and/or virtual) memory address targeted by the data access. In fact, in some embodiments, a memory controller may predict that an aspect of the computing system that generated a data block will subsequently target the data block. Additionally or alternatively, the memory controller may predict that an aspect of the computing system that previously targeted the data block will subsequently target the data block again. In other words, in some embodiments, context information associated with a data access may be indicative of one or more aspects of a computing that are expected to subsequently target a corresponding data block, for example, during an upcoming control horizon.

As such, in some embodiments, analyzing historical data access information in view of corresponding context information may enable a memory controller to identify data access patterns associated with different aspects (e.g., transaction contexts) of the computing system. To facilitate analysis in view of context information, in some embodiments, a memory controller may organize its historical data access information by transaction context. For example, a historical data access information table may be organized into multiple sections (e.g., portions) each dedicated to a different transaction context. In other words, the historical data access information may include a first section used to indicate historical data access information associated with a first transaction context, a second section implemented used to indicate historical data access information associated with a second (e.g., different) transaction context, and so on.

As an illustrative example, when the first context is the specific application (e.g., program or thread) that resulted in targeting of the first data block and the third data block, the memory controller may store the first entry corresponding with the first data block and the third entry corresponding with the third data block in the first section of the historical data access information table, for example, in chronological order relative to one another and/or other entries corresponding with data blocks associated with the specific application. Additionally or alternatively, when second context is the system interrupt that result in targeting of the second data block, the memory controller may store the second entry corresponding with the second data block in the second section of the historical data access information table, for example, in chronological order relative to one or more other entries corresponding with data blocks associated with the system interrupt. In this manner, the memory controller may differentiate between data accesses associated with (e.g., resulting from) different aspects of the computing system, thereby enabling the memory controller to determine previous data access patterns that are each associated with a specific aspect (e.g., transaction context) of the computing system. At least in some instances, this may facilitate improving prediction accuracy of subsequent data access patterns, for example, by enabling the memory controller to adaptively adjust weighting of historical data access information in its prediction.

To help illustrate, continuing with the above example, the memory controller may determine that previous targeting of the first data block and the previous targeting of the third data block are associated with the specific application (e.g., program or thread) since the first entry corresponding with the first data block and the third entry corresponding with the third data block are both included in the first section of the historical data access information table. Additionally, the memory controller may determine that previous targeting of the second data block is associated with the system interrupt since the second entry corresponding with the second data block is included in the second section of the historical data access information table. Since the system interrupt occurs independent of the specific application, in predicting a subsequent data access pattern associated with the specific application (e.g., first transaction context), the memory controller may more heavily weight the historical data access information associated with the first data block and the second data block while less heavily weighting the historical data access information associated with the third data block, for example, such that the historical data access information associated with the third data block is excluded from the prediction.

Additionally, since available in the processing sub-system, in some embodiments, a processor-side memory (e.g., cache and/or pre-fetch) controller may predictively control data storage in the processing sub-system based at least in part on context information. For example, based at least in part on the context information and historical data access information available in the processing sub-system, the processor-side memory controller may predict a subsequent data access pattern. To facilitate improving computing system operational efficiency, the processor-side memory controller may then adaptively adjust data storage in one or more memory (e.g., cache and/or buffer) levels of the processing sub-system based at least in part on the predicted subsequent data access pattern.

For example, the processor-side memory controller may control data storage in a processor-side cache such that a data block expected to be targeted during the upcoming control horizon is stored (e.g., pre-fetched and/or retained) in the processor-side cache before actually being targeted by the processing circuitry. Additionally or alternatively, the processor-side memory controller may control data storage in the processor-side cache such that a data block not expected to be targeted during the upcoming control horizon is evicted from the processor-side cache, for example, to make room for another data block that is expected to be targeted during the upcoming control horizon. In this manner, a processor-side memory controller may be implemented and/or operated to predictively control data storage in one or more memory levels of a corresponding processing sub-system, which, at least in some instances, may facilitate improving computing system operational efficiency, for example, by reducing likelihood that a targeted data block will result in a lower memory level miss.

To facilitate further improving computing system operational efficiency, in some embodiments, a memory-side memory controller may be implemented and/or operated to predictively control data storage in one or more memory levels of a memory sub-system. As described above, in some embodiments, context information associated with data accesses may be directly available to a processing sub-system and, thus, its processing-side memory controller. However, in some embodiments, the context information may not be directly available to the memory sub-system and, thus, its memory-side memory controller. As described above, at least in some instances, predicting a subsequent data access pattern without consideration of transaction context may affect (e.g., reduce or limit) prediction accuracy and, thus, resulting computing system operational efficiency.

Accordingly, to facilitate improving prediction accuracy in a memory sub-system, in some embodiments, a processing sub-system may communicate context information to the memory sub-system via a memory interface, for example, which includes a memory bus coupled between the processing sub-system and the memory sub-system, a processor-side bus interface coupled to the memory bus, a memory-side bus interface coupled to the memory bus, and/or a communication protocol that governs communication between the processing sub-system and the memory sub-system. In fact, in some embodiments, the processing sub-system may indicate one or more context parameters in a memory access request, for example, along with one or more access parameters. In other words, in such embodiments, the processing sub-system may output a memory access request indicating one or more context parameters associated with a data block along with access parameters such as, a virtual memory address used by processing circuitry to identify the data block, a physical memory address used or to be used to store the data block in the memory sub-system, size of the data block, and/or an access type (e.g., write or read) indicator (e.g., bit).

However, at least in some instances, the ability of a computing system to communicate context parameters between its processing sub-system and its memory sub-system may be limited by the memory interface (e.g., hardware and/or software) implemented therein. In particular, in some embodiments, the memory interface may include a memory bus coupled between bus interfaces implemented in the processing sub-system and the memory sub-system. Generally, a memory bus may be implemented with a fixed number of wires (e.g., conductive paths or traces) and a bus interface coupled to the memory bus may be implemented with a fixed number of pins. As such, the communication bandwidth provided by the memory interface may generally be fixed, for example, such that the memory interface may be operated to concurrently communicate up to a fixed (e.g., maximum) number of bits per clock cycle.

Additionally or alternatively, the memory interface may include a communication protocol that governs formatting and/or communication (e.g., timing and/or routing) of memory access requests. For example, to facilitate proper interpretation by memory sub-systems, the communication protocol may govern formatting of memory access requests into one or more parameter fields, which may each be used to indicate the value of a corresponding parameter. Furthermore, in some embodiments, the communication protocol may govern timing and/or routing of one or more parameter fields communicated between the processing sub-system and the memory sub-system. For example, the communication protocol may govern the clock cycle during which a parameter field is communicated (e.g., transmitted or received) and/or the bus interface pin via which the parameter field is communicated.

However, at least in some instances, including one or more context parameters in a memory access request may result in an increase in the number of bits used to indicate the memory access request, for example, compared to another (e.g., traditional) memory access request that does not include context parameters. In fact, in some embodiments, a memory access request may additionally or alternatively include one or more fulfillment parameters, which, at least in some instances, may result in a further increase in the number of bits used to indicate the memory access request. For example, the memory access request may include a priority parameter, which indicates fulfillment priority of the memory access request, and/or a cache bypass parameter. In some embodiments, a cache bypass parameter included in a read memory access request may indicates whether an instance of a target data block retrieved from a higher memory level should be stored in a lower (e.g., cache) memory level. Additionally or alternatively, a cache bypass parameter included in a write memory access request may indicate whether an instance of a target data block to be stored in a higher memory level should also be stored in a lower (e.g., cache) memory level.

In some embodiments, a processing sub-system may include a request (e.g., command) queue that stores memory access requests before output to the memory sub-system via the memory bus. In other words, at least in such embodiments, a processor-side memory controller may generate a memory access request and store the memory access request in the request queue. The memory access request may then be retrieved from the request queue and output to the memory bus via a processor-side bus interface. To facilitate including context parameters and/or fulfillment parameters in memory access requests, in some embodiments, entry bit-width in the request queue may expanded to accommodate an increased number of bits per memory access request.

Moreover, to facilitate including context parameters and/or fulfillment parameters in memory access requests, the memory interface in the computing system may be adjusted to accommodate the resulting increase in the number of bits per memory access request. In particular, in some embodiments, the communication protocol used by the memory interface may be adjusted to allocate one or more context parameter fields, which may each be used to indicate the value of a corresponding context parameter, for example, in addition to one or more access parameter fields, which may each be used to indicate the value of a corresponding access parameter. Additionally or alternatively, the communication protocol may be adjusted to allocate one or more fulfillment parameter fields, which may each be used to indicate the value of a corresponding fulfillment parameter.

Furthermore, as described above, communication bandwidth provided by a memory interface generally has a fixed upper limit, for example, governed by the number of wires implemented in the memory bus and/or the number of pins implemented in a bus interface coupled to the memory bus. To facilitate including a context parameters and/or a fulfillment parameter in a memory access request, in some embodiments, the communication protocol may be adjusted to increase the number of clock cycles during which the memory access request is communicated (e.g., transmitted and/or received). For example, the processing sub-system may output an access parameter field of a memory access request during a first clock cycle and a context parameter field of the memory access request during a second (e.g., different, previous, or subsequent) clock cycle. However, at least in some instances, increasing the number of clock cycles during which a memory access request is communicated may delay response of the memory sub-system and, thus, affect computing system operational efficiency.

Accordingly, to facilitate including context parameters and/or fulfillment parameters in memory access requests, in some embodiments, the memory interface may additionally or alternatively be adjusted to increase communication bandwidth provided between the processing sub-system and the memory sub-system. In some embodiments, the communication bandwidth may be increased by increasing the number of parallel data paths, which each includes a pair of bus interface pins and a memory bus wire coupled between the pair of bus interface pins, implemented in the memory interface. In other words, at least in such embodiments, the memory interface may be adjusted to increase the number of wires included in the memory bus and to increase the number of pins in each bus interface coupled to the memory bus.

By increasing the number of data paths, in some embodiments, the number of bits communicated per clock cycle and, thus, the communication bandwidth provided by the memory interface may be increased. In fact, leveraging the increased communication bandwidth, in some embodiments, the computing system may be implemented and/or operated to concurrently communicate different parameter fields via different data paths (e.g., bus interface pin and memory bus wire sets) in the memory interface. For example, the memory interface may include a first data path, which includes a first processor-side bus interface pin, a first memory-side bus interface pin, and a first memory bus wire coupled therebetween, as well as a second data path, which includes a second processor-side bus interface pin, a second memory-side bus interface pin, and a second memory bus wire coupled therebetween. In some embodiments, the computing system may be implemented and/or operated to communicate an access parameter field via the first data path while concurrently communicating a context parameter field via the second data path.

In other words, at least in such embodiments, the computing system may be implemented and/or operated to communicate a context parameter indicated in the context parameter field during the same clock cycle as an access parameter indicated in the access parameter field, for example, instead of during different (e.g., successive) clock cycles. In fact, in some embodiments, increasing communication bandwidth provided by the memory interface may facilitate reducing the number of clock cycles during which a memory access request is communicated and, thus at least in some instances, may facilitate improving computing system operational efficiency. However, at least in some instances, increasing communication bandwidth may affect (e.g., increase) implementation associated cost of a computing system, for example, by resulting in an increase in its physical footprint, its component count, and/or the number of manufacturing steps used to implement the computing system.

To facilitate reducing the effect inclusion of context information has on operational efficiency and/or implementation associated cost, in some embodiments, a processing sub-system may hash the value of one or more context parameters before transmission (e.g., output or supply) to a memory sub-system. For example, a processor-side memory controller may perform a hash operation (e.g., function) on the value of one or more context parameters to determine a hashed context parameter with a fixed bit-length. In such embodiments, the communication protocol of the memory interface may be adjusted to allocate one or more hashed context parameter fields, which may each be used to indicate the value of a corresponding hashed context parameter.

Additionally, in some embodiments, the fixed bit-depth of a hashed context parameter may be less than the combined bit-depth of the one or more context parameters hashed to generate the hashed context parameter. In other words, in some embodiments, hashing one or more context parameters before transmission to the memory sub-system may facilitate reducing the total number of bits communicated via the memory interface and, thus, the effect inclusion of context parameters has on operational efficiency and/or implementation associated cost of a computing system. In particular, reducing the total number of bits used to indicate a memory access request may enable fewer data paths to be implemented in the memory interface, which, at least in some instances, may facilitate reducing implementation associated cost of the computing system, for example, by reducing physical footprint and/or component count of its memory interface. Additionally or alternatively, reducing the total number of bits used to indicate a memory access request may enable the memory access request to be communicated using fewer clock cycles, which, at least in some instances, may facilitate improving operational efficiency of the computing system, for example, by reducing the delay before the memory sub-system responds to the memory access request.

When context information is received using hashed context parameters, in some embodiments, a memory sub-system may track context of data accesses using the hashed context parameter values, for example, instead of explicitly re-determining the original values of context parameters used to generate the hashed context parameter values. In other words, at least in such embodiments, a memory-side memory controller may determine that data blocks and/or memory addresses associated with different hashed context parameter values correspond to different transaction context. For example, the memory-side memory controller may organize its historical data access information table such that different sections are each associated with a different hashed context parameter value.

However, in some embodiments, hashing the value of one or more context parameters to generate a hashed context parameter with a lower bit-depth may result in some amount of precision loss. For example, in some instance, performing a hash operation on a first application instruction context parameter, which identifies a first application instruction, and a second application instruction context parameter, which identifies a second application instruction different from the first application instruction, may nevertheless result in the same hashed context parameter value. Thus, at least in such instances, the hash operation performed by the memory controllers may result in the memory-side memory controller improperly identifying context of memory access requests.

In other words, in some embodiments, a hash function used by the processor-side memory controller may provide a tradeoff between resulting prediction accuracy and the total number of bits used to indicate memory access requests. In fact, in some embodiments, the processor-side memory controllers may selectively utilize different hash functions, for example, which result in different output bit-depths and, thus, different tradeoffs between prediction accuracy and the number of bits per memory access requests. To facilitate proper interpretation of a hashed context parameter included in a memory access request, at least in such embodiments, the processor-side memory controller may indicate the hash function used to generate the hashed context parameter, for example, via a hash function context parameter indicated in an additional context parameter field of the memory access request.

Moreover, to facilitate improving operational flexibility, in some embodiments, the communication protocol of the memory interface may be adjusted to enable different types of context parameters to be indicated in different memory access requests. For example, a first memory access request and a second memory access request may both include a context parameter field. However, the context parameter field in the first memory access request may be used to indicate the value of an application instruction context parameter while the context parameter field in the second memory access request is used to indicate the value of a processor context parameter. To facilitate proper interpretation of context parameters included in different memory access requests, at least in such embodiments, the processor-side memory controller may indicate the type of context parameter indicated in the context field of a memory access request, for example, via a context type context parameter indicated in an additional context parameter field of the memory access request.

In this manner, as will be described in more detail below, a computing system may be implemented and/or operated in accordance with the present disclosure to facilitate communicating context information between its processing sub-system and its memory sub-system. As will be described in more detail below, in some embodiments, passing the context information to the memory sub-system may enable the memory sub-system to predict a subsequent (e.g., upcoming) data access pattern based at least in part on the context information and control data storage in the memory sub-system accordingly, for example, such that a data block expected to be targeted by the subsequent data access pattern is stored in a lower memory level and/or a data block not expected to be targeted by the subsequent data access pattern is evicted to a higher memory level. In other words, at least in some instances, implementing and/or operating a computing system in this manner may facilitate improving data retrieval latency provided by its memory sub-system and, thus, operational efficiency of the computing system.

To help illustrate, an example of a computing system 10 (e.g., apparatus), which includes a processing sub-system 12 (e.g., system) and a memory sub-system 14 (e.g., system), is shown in FIG. 1. It should be appreciated that the depicted example is merely intended to be illustrative and not limiting. In particular, the computing system 10 may additionally or alternatively include other computing sub-systems. For example, the computing system 10 may additionally include a networking sub-system, a radio frequency sub-system, a user input sub-system, and/or a display sub-system.

Moreover, in some embodiments, the computing system 10 may be implemented in a single electronic device, such as a desktop computer, a workstation computer, a laptop computer, a server, a mobile phone, a virtual-reality headset, and/or the like. In other embodiments, the computing system 10 may be distributed between multiple electronic devices. For example, the processing sub-system 12 and the memory sub-system 14 may be implemented in a host device while other computing sub-systems, such as the user input sub-system and/or the display sub-system, may be implemented in a client (e.g., remote) device. In fact, in some embodiments, a computing sub-system may be distributed between multiple electronic devices. For example, a first portion of the processing sub-system 12 and/or a first portion of the memory sub-system 14 may be implemented in a host device while a second portion of the processing sub-system 12 and/or a second portion of the memory sub-system 14 may be implemented in a client device.

In any case, during operation of the computing system 10, the processing sub-system 12 generally performs various operations, for example, to determine output data by executing instructions in a processor to perform a corresponding data processing operation on input data. Thus, as in the depicted example, the processing sub-system 12 may include processing circuitry 16. In some embodiments, the processing circuitry 16 may be included in one or more central processing units (CPUs), one or more graphics processing units (GPUs), one or more processor cores, or any combination thereof.

Additionally, as in the depicted example, the processing circuitry 16 may include one or more registers 22. In some embodiments, a register 22 may provide one or more storage locations directly accessible to the processing circuitry 16. However, storage capacity of the registers 22 is generally limited. As such, the processing sub-system 12 may be communicatively coupled to the memory sub-system 14, which provides additional data storage capacity, via one or more communication buses 20. In some embodiments, a communication bus 20 may include one or more cables, one or more wires, one or more conductive traces, one or more communication networks, or any combination thereof.

In other words, the processing sub-system 12 and the memory sub-system 14 may communicate via the one or more communication buses 20. For example, the processing sub-system 12 may communicate (e.g., output or transmit) a write memory access request along with data for storage in the memory sub-system 14 and/or a read memory access request targeting data previously stored in the memory sub-system 14. Additionally or alternatively, the memory sub-system 14 may communicate (e.g., output or return) target data previously storage therein, for example, in response to a read memory access request to enable processing and/or execution by the processing circuitry 16 implemented in the processing sub-system 12.

To enable communication via a communication bus 20, as in the depicted example, the processing sub-system 12 and the memory sub-system 14 may each include one or more bus interfaces 32. Additionally, to provide data storage, as in the depicted example, the memory sub-system 14 may include one or more memory devices 18 (e.g., chips or integrated circuits). As will be described in more detail below, in some embodiments, the memory devices 18 may include memory cells (e.g., circuitry) organized into one or more memory arrays 28 and, thus, may include one or more tangible, non-transitory, computer-readable media. For example, the memory sub-system 14 may include one or more memory device 18 communicatively coupled to the processing sub-system 12 via a memory (e.g., external) bus 20.

However, as described above, communication between different computing sub-systems is generally slower than communication within a computing sub-system. In other words, data communication within (e.g., internal to) the processing sub-system 12 may be faster and, thus, facilitate reducing data retrieval latency compared to data communication between the processing sub-system 12 and the memory sub-system 14, for example, due to the communication bus 20 being shared with other computing sub-systems, timing difference between the processing sub-system 12 and the memory sub-system 14, and/or communication distance between the processing sub-system 12 and the memory sub-system 14. Thus, to facilitate improving operational efficiency, one or more caches and/or one or more buffers may be implemented between the processing circuitry 16 of the processing sub-system 12 and the memory devices 18 of the memory sub-system 14. As will be described in more detail below, in some embodiments, a cache may provide storage locations organized into one or more cache lines 30, for example, to store an instance (e.g., copy) of data also stored in a memory array 28 implemented in one or more memory devices 18.

As in the depicted example, the computing system 10 may include one or more processor-side caches 24 implemented in the processing sub-system 12. In some embodiments, one or more of the processor-side caches 24 may be integrated with the processing circuitry 16. For example, the processor-side caches 24 may include a level one (L1) cache, a level two (L2) cache, and/or a level three (L3) cache. To facilitate reducing data retrieval latency, in some embodiments, a processor-side cache 24 may be implemented using a different memory type compared to the memory devices 18 implemented in the memory sub-system 14. For example, the processor-side cache 24 may be implemented with static random-access memory (SRAM) while the memory devices 18 are implemented with dynamic random-access memory (DRAM) and/or non-volatile memory.

Additionally, as in the depicted example, the computing system 10 may include one or more memory-side caches 26 implemented in the memory sub-system 14. Although implemented in the memory sub-system 14, a memory-side cache 26 may nevertheless provide faster data communication compared to a memory array 28 implemented in the memory devices 18, for example, due to the memory-side cache 26 being implemented with static random-access memory (SRAM) while the memory devices 18 are implemented with dynamic random-access memory (DRAM). Additionally or alternatively, a memory-side cache 26 and a memory array 28 implemented in the one or more memory devices 18 may utilize the same memory type (e.g., DRAM). In fact, in some embodiments, one or more of the memory-side caches 26 may be implemented in the memory devices 18.

Furthermore, as in the depicted example, the computing system 10 may include one or more pre-fetch buffers 31. For example, the processing sub-system 12 may include a processor-side pre-fetch buffer 31A distinct (e.g., separate) from its processor-side caches 24. Additionally or alternatively, the memory sub-system 14 may include a memory-side pre-fetch buffer 31B distinct (e.g., separate) from its memory-side caches 26. In some embodiments, a pre-fetch buffer 31 may be implemented and/or operated to store data pre-fetched (e.g., fetched before actually targeted by processing circuitry 16) from a higher memory level, for example, before transferring the pre-fetched data to a cache. In other embodiments, pre-fetched data may be directly stored into a cache and, thus, the pre-fetch buffers 31 may be optional.

In any case, to facilitate controlling data storage therein, the computing system 10 may include one or more memory controllers 34, for example, communicatively coupled to the caches, the pre-fetch buffers 31, and/or the memory devices 18 via an instruction bus 20A. In some embodiments, a memory controller 34 may include a cache controller 35 implemented and/or operated to control data storage in one or more cache memory levels. Additionally or alternatively, the memory controller 34 may include a pre-fetch controller 37 implemented and/or operated to control data storage in one or more pre-fetch buffer memory levels.

Furthermore, in some embodiments, the memory controller 34 may additionally or alternatively include a main memory controller 41, such as a DRAM memory controller 34, implemented and/or operated to control data storage in one or more memory array memory levels. Thus, in some embodiments, one or more memory controllers 34 may be implemented in the memory sub-system 14, for example, as a memory-side memory controller 34. Additionally or alternatively, one or more memory controllers 34 may be implemented in the processing sub-system 12, for example, as a processor-side memory controller 34.

Figure 2:
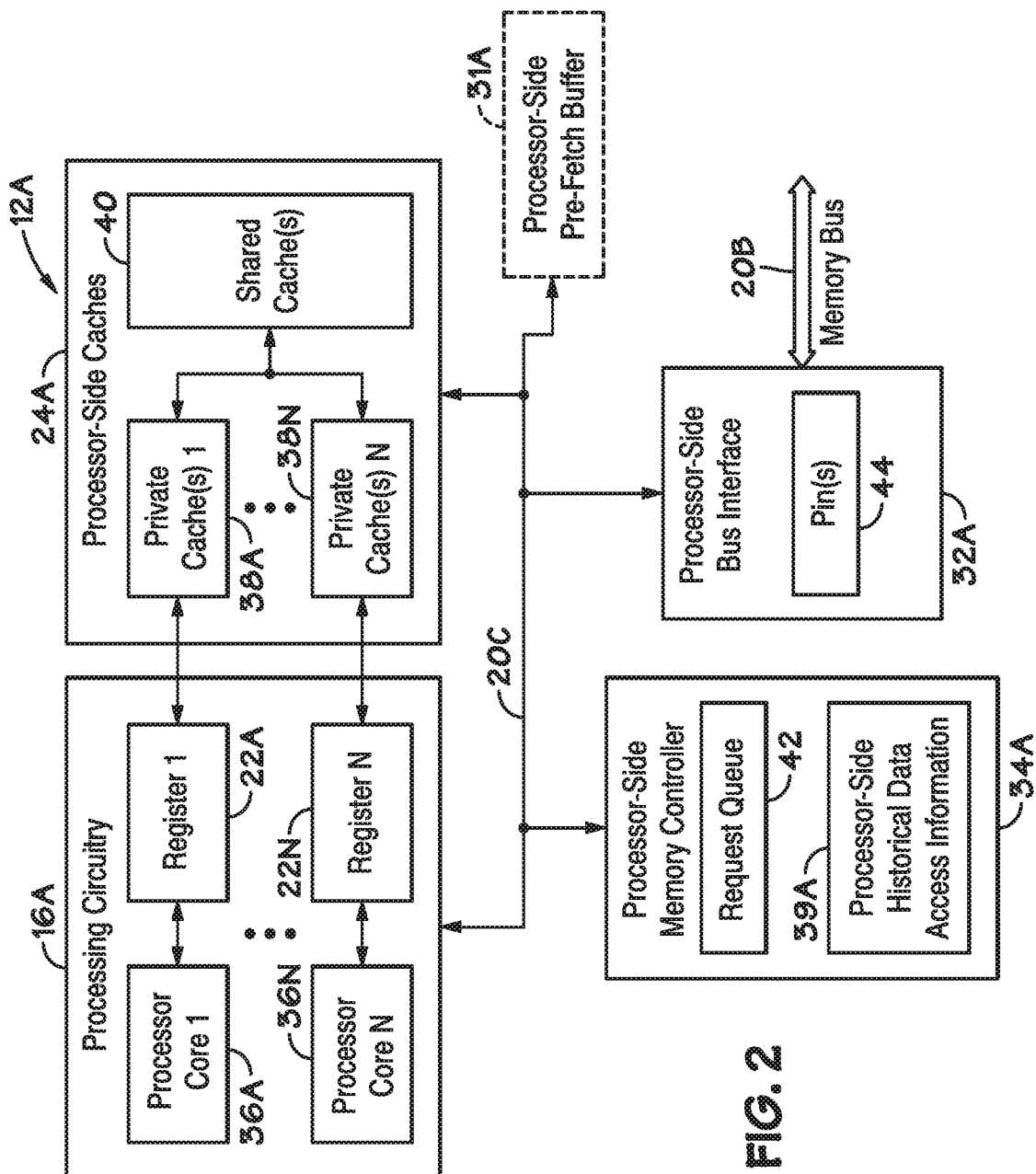
FIG. 2 is a block diagram of an example of the processing sub-system of FIG. 1, in accordance with an embodiment of the present disclosure.

To help illustrate, an example of a processing sub-system 12A, which includes a processor-side memory controller 34A, is shown in FIG. 2. As described above, in some embodiments, processing circuitry 16 of a processing sub-system 12 may be implemented using one or more processor cores 36. For example, the processing circuitry 16A in the processing sub-system 12A may include at least a first processor core 36A and an Nth processor core 36N. However, it should appreciated that the depicted example is merely intended to be illustrative and not limiting. For example, in other embodiments, a processing sub-system 12 may include a single processor core 36 or more than two (e.g., four, eight, or sixteen) processor cores 36.

Additionally, as described above, in some embodiments, a processing sub-system 12 may include one or more registers 22, which provide storage locations directly accessible to its processing circuitry 16. For example, the processing sub-system 12A may include at least a first register 22A, which may provide a storage location directly accessible to the first processor core 36A, and an Nth register 22N, which may provide a storage location directly accessible to the Nth processor core 36N. To facilitate increasing storage provided on the processor-side of a memory bus 20B, as described above, a processing sub-system 12 may include one or more processor-side caches 24 and/or a processor-side pre-fetch buffer 31A. In some embodiments, a processor-side cache 24 and/or the processor-side pre-fetch buffer 31A may be implemented using volatile memory, such as static random-access memory (SRAM) and/or dynamic random-access memory (DRAM).

Furthermore, in some embodiments, the processor-side caches 24 may be organized to implement one or more hierarchical memory (e.g., cache) levels. For example, the processor-side caches 24A may include private processor-side caches 38, which may be used to implement one or more lower (e.g., lowest) memory levels, and a shared processor-side cache 40, which may be used to implement a higher (e.g., intermediate) memory level. In some embodiments, the data storage provided by the shared processor-side cache 40 may be shared by at least the first processor core 36A and the Nth processor core 36N. For example, the shared processor-side cache 40 may include one or more level three (L3) processor-side caches 24A.

On the other hand, in some embodiments, the data storage provided by a private processor-side cache 38 may be dedicated to a corresponding processor core 36. For example, a first one or more private processor-side caches 38A may include a level one (L1) processor-side cache 24A dedicated to the first processor core 36A and a level two (L2) processor-side cache 24A cache dedicated to the first processor core 36A. Additionally or alternatively, an Nth one or more private processor-side caches 38N may include a level one (L1) processor-side cache 24A dedicated to the Nth processor core 36N and a level two (L2) processor-side cache 24A dedicated to the Nth processor core 36N.

In any case, the processor-side memory controller 34A may generally control data storage in the processing sub-system 12A. For example, the processor-side memory controller 34A may control data storage such that data targeted by the processing circuitry 16A is returned to one or more of its registers 22. In other words, in some embodiments, the processor-side memory controller 34A controls data storage in the processor-side caches 24A, the processor-side pre-fetch buffer 31A, and/or the registers 22 implemented in the processing sub-system 12A. Thus, as in the depicted example, the processor-side memory controller 34A may be communicatively coupled to the processing circuitry 16A, the processor-side caches 24A, and/or the processor-side pre-fetch buffer 31A via one or more processor-side internal buses 20C, for example, to enable the processor-side memory controller 34A to determine data targeted by the processing circuitry 16A and/or to output control (e.g., command) signals that instruct (e.g., cause) the processing sub-system 12A to adjust data storage therein.

In fact, to facilitate improving data access speed and, thus, operational efficiency of the computing system 10, in some embodiments, the processor-side memory controller 34A may predictively control data storage in the processing sub-system 12A, for example, based at least in part on processor-side historical data access information 39A. In other words, in such embodiments, the processor-side memory controller 34A may control data storage in the processing sub-system 12A based at least in part on what data is expected to be targeted (e.g., requested) by the processing circuitry 16A and/or when the data is expected to be targeted (e.g., requested) by the processing circuitry 16A. For example, the processor-side memory controller 34A may control data storage such that instances (e.g., copies) of data blocks expected to be targeted by the processing circuitry 16A during an upcoming control horizon (e.g., one or more clock cycles) are stored in one or more of the processor-side caches 24 before the processing circuitry 16A actually targets (e.g., requests) the data blocks 29.

However, as described above, storage capacity implemented in a processing sub-system 12 is generally smaller than storage capacity implemented in a corresponding memory sub-system 14. In fact, in some embodiments, the total storage capacity of the processor-side caches 24 may be smaller than the storage capacity of a memory array 28 implemented in the memory sub-system 14. As such, to facilitate conserving (e.g., optimizing) storage capacity of the processor-side caches 24, in some embodiments, the processor-side memory controller 34A may control data storage in the processing sub-system 12A such that instances of data blocks 29 not expected to be targeted by the processing circuitry 16A during an upcoming control horizon are not stored in the processor-side caches 24.

However, a data access pattern predicted by a memory controller 34 is often less than perfect. In other words, at least in some instances, a predicted data access pattern determined by the processor-side memory controller 34A may differ at least in part from the actual data access pattern of the processing circuitry 16A. Accordingly, at least in such instances, data targeted by the processing circuitry 16A may not be currently stored in the processing sub-system 12A and, thus, result in a processor-side miss.

When a processor-side miss results, as described above, the processing sub-system 12A may request return of target data from a memory sub-system 14 coupled to the memory bus 20B. For example, the processor-side memory controller 34A may output a read memory access that requests return of data targeted by the processing circuitry 16A. Additionally or alternatively, the processor-side memory controller 34A may output a write memory access request along with data that requests storage of the data in the memory sub-system 14. In some embodiments, the processor-side memory controller 34A may store memory access requests in a request (e.g., command) queue 42 before supply to the memory sub-system 14 via the memory bus 20B.

Furthermore, in some embodiments, the processor-side memory controller 34A may control data storage in the processing sub-system 12A such that data received (e.g., returned) via the memory bus 20B is stored in a register 22 of the processing circuitry 16A and/or a processor-side cache 24A. For example, the processing sub-system 12A may store a copy of a data block returned via the memory bus 20B in one or more processor-side caches 24A to facilitate reducing data retrieval latency if the processing circuitry 16A targets the data block again. Additionally or alternatively, the processing sub-system 12A may store a copy of a data block returned via the memory bus 20B directly into one or more registers 22 of the processing circuitry 16A, for example, when a cache bypass parameter is set (e.g., high or "1-bit") by a memory access instruction (e.g., non-temporal load instruction) of an application (e.g., program or thread).

Thus, as in the depicted example, a processor-side bus interface 32A may be coupled between the memory bus 20B and the one or more processor-side internal buses 20C. Additionally, as in the depicted example, the processor-side bus interface 32A may include one or more pins 44. As will be described in more detail below, in some embodiments, each pin 44 of a bus interface 32 may be coupled to a corresponding wire in the memory bus 20B. By implementing a processing sub-system 12 in this manner, a processor-side memory controller 34A may be operated to control data storage in the processing sub-system 12, for example, predictively during operation of a corresponding computing system 10.

Figure 3:
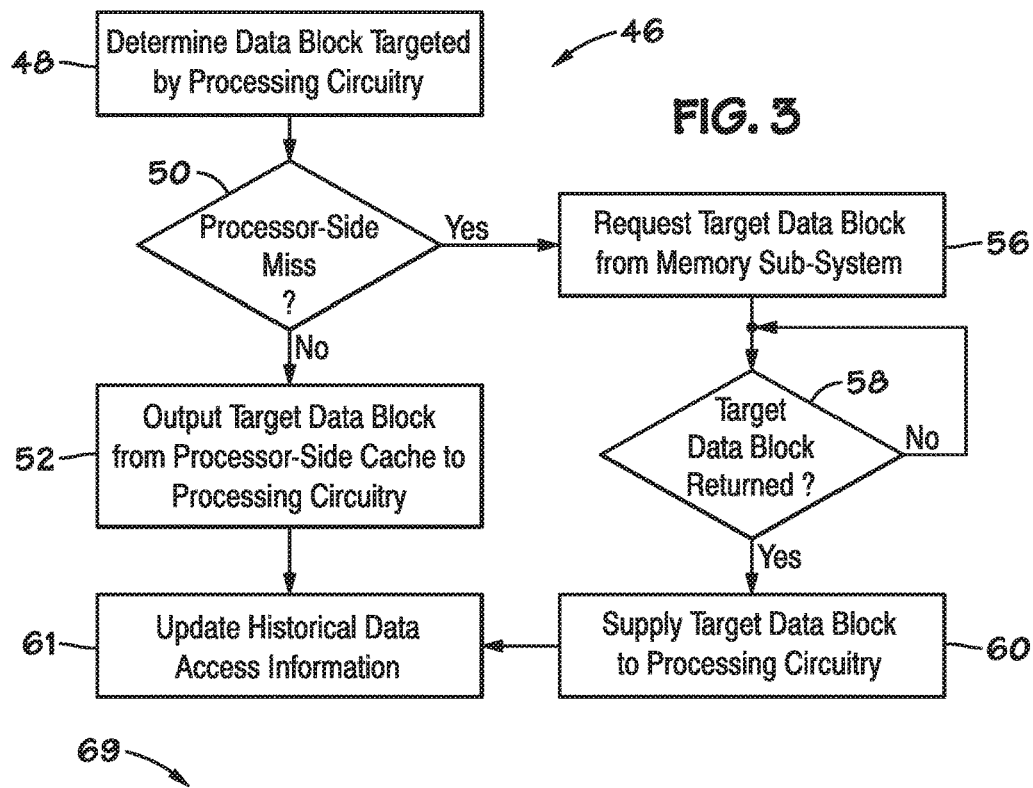
FIG. 3 is a flow diagram of an example process for operating the processing sub-system of FIG. 2, in accordance with an embodiment of the present disclosure.

To help further illustrate, an example of a process 46 for operating a processing sub-system 12 is described in FIG. 3. Generally, the process 46 includes determining a data block targeted by processing circuitry (process block 48), determining whether the target data block results in a processor-side miss (decision block 50), and outputting the target data block from a processor-side cache to the processing circuitry when the target data block does not result in a processor-side miss (process block 52). Additionally, when the target data block results in a processor-side miss, the process 46 includes requesting the target data block from a memory sub-system (process block 56), determining whether the target data block has been returned from the memory sub-system (decision block 58), and supplying the target data block to the processing circuitry after the target data block is returned from the memory sub-system (process block 60). Furthermore, the process 46 includes updating historical data access information (process block 61).

Although described in a particular order, which represents a particular embodiment, it should be noted that the process 46 may be performed in any suitable order. Additionally, embodiments of the process 46 may omit process blocks and/or include additional process blocks. Moreover, in some embodiments, the process 46 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a processor-side (e.g., cache and/or pre-fetch) memory controller 34A in a processing sub-system 12 of a computing system 10 may determine a data block targeted by processing circuitry 16 of the processing sub-system 12 (process block 48). In some embodiments, processing circuitry 16 may identify a target data block using a corresponding (e.g., target) virtual memory address. Based at least in part on the target virtual memory address, in some embodiments, the processor-side memory controller 34A may determine a corresponding (e.g., target) physical memory address, which indicates storage location of the target data block in the computing system 10.

Additionally, the processor-side memory controller 34A may determine whether the target data block results in a processor-side miss (decision block 50). In some embodiments, a memory controller 34 may determine whether a data block is stored in a cache based at least in part on a virtual memory address and/or a physical memory address associated with the data block. For example, based at least in part on its virtual memory address and physical memory address, the memory controller 34 may determine a target value of tag parameter (e.g., metadata) expected to be associated with the target data block.

By searching valid cache lines 30 included in the processor-side caches 24 based on the target tag parameter value, the processor-side (e.g., cache) memory controller 34A may determine whether the target data block results in a processor-side miss. For example, when the target tag parameter value does not match the tag parameter values included in any of the cache lines 30 in the processor-side caches 24, the processor-side memory controller 34A may determine that the target data block results in a processor-side miss. On the other hand, when the target tag parameter value is included in one or more cache lines 30 of the processor-side caches 24, the processor-side memory controller 34A may determine that the target data block results in a processor-side cache hit and, thus, does not result in a processor-side cache miss.

When the target data block does not result in a processor-side miss, the processor-side memory controller 34A may instruct the processor-side caches 24 to supply the target data block to the processing circuitry 16, for example, to facilitate improving data retrieval speed and, thus, operational efficiency of the computing system 10 (process block 52). In some embodiments, a processor-side cache 24 may output a cache line 30 with a tag parameter value that matches the target tag parameter value expected to be associated with the target data block. When stored in a higher memory (e.g., cache) level (e.g., shared processor-side cache 40), in some embodiments, the target data block may pass through one or more lower memory levels (e.g., private processor-side caches 38) in the processing sub-system 12 before reaching the processing circuitry 16.

On the other hand, when it results in a processor-side miss, the processor-side memory controller 34A may request the target data block from a memory sub-system 14 of the computing system 10 (process block 56). For example, the processor-side memory controller 34A may request return of the target data block by outputting a memory access request that includes one or more access parameters to be used by the memory sub-system 14 to retrieve the target data block. As described above, in some embodiments, a memory access request generated by a processor-side memory controller 34A may be stored in a request (e.g., command) queue 42 before output to the memory sub-system 14 via a memory bus 20B.

Additionally, as will be described in more detail below, in some embodiments, the value of an access parameter may be indicated in a corresponding access parameter field included in the memory access request. For example, a virtual memory address used by the processing circuitry 16 to identify the target data block may be indicated in a first access parameter field, a physical memory address identifying the storage location of the target data block in the memory sub-system 14 may be indicated in a second access parameter field, the size (e.g., bit depth) of the target data block may be indicated in a third access parameter field, a write access indicator (e.g., bit) may be indicated in a fourth access parameter field, or any combination thereof. Thus, as will be described in more detail below, the memory sub-system 14 may identify and return the target data block based at least in part on the value of one or more access parameters indicated in the memory access request.

Once the target data block is returned from the memory sub-system 14, the processor-side memory controller 34A may instruct the processing sub-system 12 to supply the target data block to the processing circuitry 16 (process block 60). In some embodiments, the processor-side memory controller 34A may instruct the processing sub-system 12 to store a copy of the target data block returned from the memory sub-system 14 in one or more registers 22 of the processing circuitry 16. Additionally, in some embodiments, the processor-side memory controller 34A may instruct the processing sub-system 12 to store a copy of the target data block in one or more processor-side caches 24, for example, to facilitate reducing data retrieval latency if the processing circuitry 16 subsequently targets the data block again.

In this manner, a processing sub-system 12 in a computing system 10 may be operated to provide target data to its processing circuitry 16, for example, to enable the processing circuitry 16 to execute and/or process the target data. As described above, to facilitate improving computing system operational efficiency, in some embodiments, the processor-side memory controller 34A may predictively control data storage in the processing sub-system 12. For example, the processor-side memory controller 34A may predictively control what data is stored in the processing sub-system 12 and/or what memory (e.g., cache and/or pre-fetch buffer) level at which data is stored in the processing sub-system 12.

As will be described in more detail below, in some embodiments, a memory controller 34 may predictively control data storage based at least in part on historical data access information indicative of one or more previous data access patterns. Thus, to facilitate predictively controlling data storage during a subsequent control horizon (e.g., one or more clock cycles), the processor-side memory controller 34A may update its processor-side historical data access information 39A to indicate information associated with accessing (e.g., targeting and/or requesting) of the target data (process block 61). In some embodiments, historical data access information 39 may be indicated (e.g., stored and/or read) using a table structure.

Figure 4:
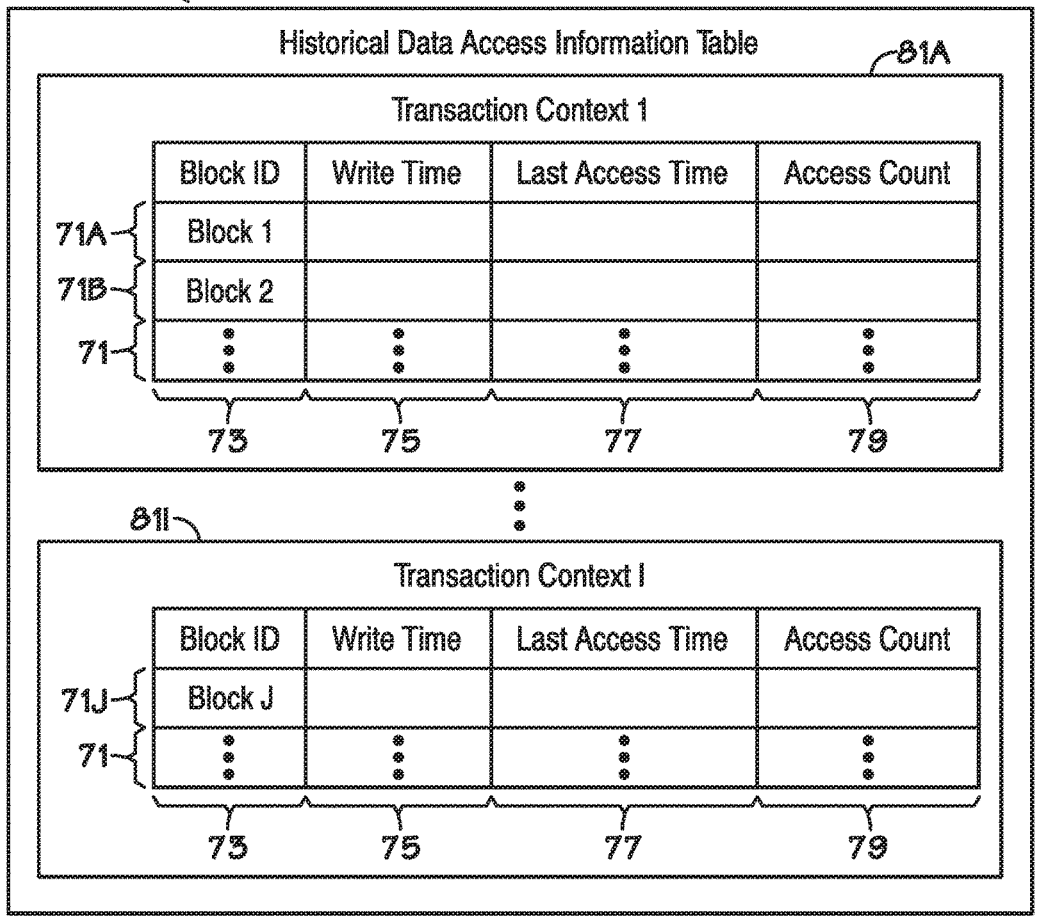
FIG. 4 is a diagrammatic representation of historical data access information organized by transaction context, in accordance with an embodiment of the present disclosure.

To help illustrate, an example of a historical data access information table 69, which may be monitored and/or utilized by a (e.g., processor-side or memory-side) memory controller 34, is shown in FIG. 4. As in the depicted example, the historical data access information table 69 may include one or more entries (e.g., rows) 71. Additionally, as in the depicted example, each entry 71 may include a block identifier field (e.g., column) 73, a write time field 75, a last access time field 77, and an access count field 79. However, it should be appreciated that the depicted example is merely intended to be illustrative and not limiting. For example, in other embodiments, the historical data access information table 69 may additionally or alternatively include other types of data, fields, and/or information.

In any case, with regard to the depicted example, each entry 71 in the historical data access information table 69 may identify an associated data block in its block identifier field 73. For example, a first block identifier parameter in a first entry 71A may indicate that the first entry is associated with a first data block. Similarly, a second block identifier parameter in a second entry 71B may indicate that the second entry 71B is associated with a second data block and a Jth block identifier parameter in a Jth entry 71J may indicate that the Jth entry 71J is associated with a Jth data block. In some embodiments, an entry 71 may identify a corresponding data block via its virtual memory address, its physical memory address, and/or a tag parameter value, for example, determined based on the virtual memory address and/or the physical memory address of the corresponding data block.

Additionally, as in the depicted example, each entry 71 in the historical data access information table 69 may associate a corresponding data block with a write time parameter indicated in the write time field 75, a last access time parameter indicated in the last access time field 77, and an access count parameter indicated in the access count field 79. For example, the first entry 71A may associate the first data block with a write time parameter that indicates when the first data block was initially stored in the memory sub-system 14, a last access time parameter that indicates when the first data block was most recently accessed (e.g., targeted or requested), and an access count parameter that indicates the number of times the first data block has been accessed. Additionally, the second entry 71A may associate the second data block with a write time parameters parameter that indicates when the second data block was initially stored in the memory sub-system 14, a last access time parameter that indicates when the second data block was most recently accessed, and an access count parameter that indicates the number of times the second data block has been accessed. Furthermore, the Jth entry 71J may associate the Jth data block with a write time parameter that indicates when the Jth data block was initially stored in the memory sub-system 14, a last access time parameter that indicates when the Jth data block was most recently accessed, and an access count parameter that indicates the number of times the Jth data block has been accessed.

Moreover, as in the depicted example, the entries 71 in the historical data access information table 69 may be organized into multiple table sections 81. In some embodiments, different table sections 81 in the historical data access information table 69 may be dedicated to different transaction contexts. For example, a first table section 81A may be dedicated to indicating entries 71 corresponding with data blocks associated with a first transaction context while an Ith table section 81I may be may be dedicated to indicating entries 71 corresponding with data blocks associated with an Ith (e.g., second or different) transaction context. However, it should again be appreciated that the depicted example is merely intended to be illustrative and not limiting. For example, in other embodiments, entries 71 in the historical data access information table 69 may be organized into more than two table sections 81.

As will be described in more detail below, in some embodiments, transaction context associated with a data block may be indicated via context information (e.g., one or more parameters) that identifies one or more aspects of the computing system associated with (e.g., that generated and/or targeted) the data block and/or a (e.g., physical and/or virtual) corresponding memory address. For example, the context information associated with a data block may include a processor context parameter, which identifies one or more processors in a computing system 10 that generated the data block, that is currently targeting the data block, and/or that previously targeted the data block. Additionally, in some embodiments, transaction context information associated with a data block may include a processor core context parameter, which identifies one or more processor cores 36 in a computing system 10 that generated the data block, that is currently targeting the data block, and/or that previously targeted the data block. Furthermore, in some embodiments, transaction context information associated with a data block may include an application (e.g., program or thread) context parameter that identifies one or more applications, which when run in a computing system 10, resulted in generation of the data block, the data block currently being targeted, and/or the data block previously being targeted. Moreover, in some embodiments, transaction context information associated with a data block may include an application instruction (e.g., program counter) context parameter that identifies one or more application instructions, which when executed by a computing system 10, resulted in generation of the data block, the data block currently being targeted, and/or the data block previously being targeted.

In some embodiments, different sets of context parameters may correspond with different transaction contexts. For example, the first transaction context associated with the first table section 81A may correspond to a first set of context parameters that includes a processor context parameter, which identifies a processor associated with the first data block and the second data block, and an application context parameter, which identifies an application associated with the first data block and the second data block. On the other hand, the Ith transaction context associated with the Ith table section 81I may corresponding to an Ith set of context parameters that includes a processor context parameter, which identifies a processor associated with the Jth data block.

In other words, in some embodiments, a (e.g., processor-side and/or memory-side) memory controller 34 may determine transaction context associated with a data access by comparing the value of one or more context parameters associated with the data access against corresponding context parameter values associated with one or more candidate transaction contexts. In some embodiments, the value of each context parameters associated with data accesses and candidate transaction contexts may explicitly (e.g., specifically or directly) identify a corresponding aspect of a computing system 10. Accordingly, in such embodiments, the memory controller 34 may identify a candidate transaction context, which is associated with context parameter values that each match a corresponding context parameter value associated with a data access, as the transaction context of the data access.

In other embodiments, the value of one or more context parameters associated with a data access may be hashed to generate a hashed context parameter. In other words, in such embodiments, the value of hashed context parameters associated with data accesses and candidate transaction contexts may indirectly identify one or more aspects of a computing system 10. As such, in some embodiments, the memory controller 34 may identify different hashed context parameter values as corresponding with different transaction context. In other words, in such embodiments, the memory controller 34 may identify a candidate transaction context, which is associated with a hashed context parameter value that matches a hashed context parameter value associated with a data access, as the transaction context of the data access.

Based at least in part on the transaction context of a data access, the memory controller 34 may update its historical data access information 39 accordingly, for example, in response to receipt of a memory access request and/or fulfillment of the memory access request. In particular, in some embodiments, the memory controller 34 may add an entry 71 corresponding with a data block targeted by the data access to a table section 81 associated with the transaction context of the data access, for example, in chronological order relative to other entries 71 in the table section 81 to facilitate identifying a previous data access pattern associated with the transaction context. Additionally or alternatively, the memory controller 34 may update the last access time parameter and/or increment the access count parameter indicated in the entry 71 associated with the data block targeted by the data access. In this manner, historical data access information 39 may be organized based at least in part on transaction context, which, at least in some instances, may facilitate improving prediction accuracy and, thus, efficacy of predictive data storage control techniques.

Figure 5:
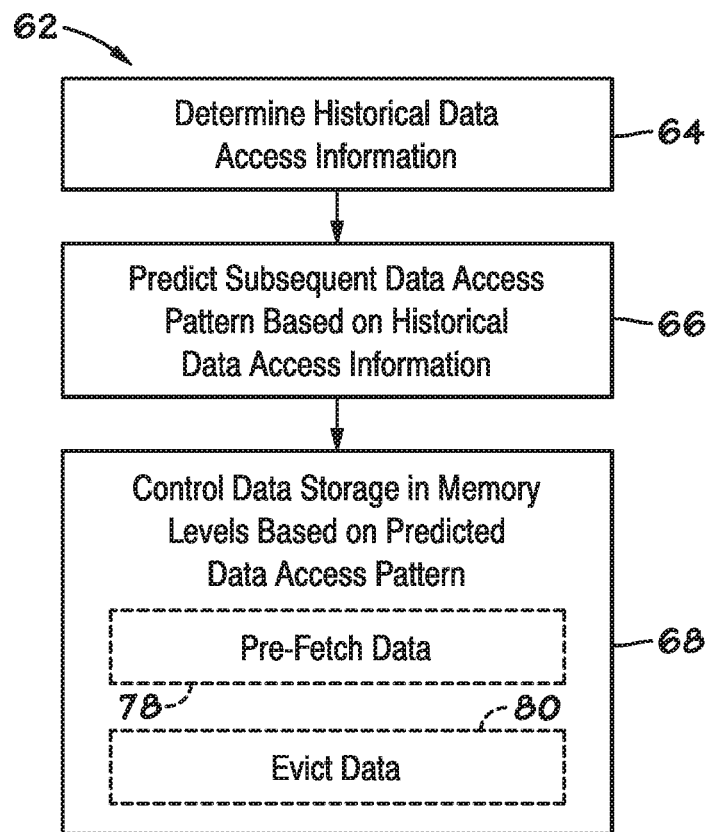
FIG. 5 is a flow diagram of an example process for predictively controlling data storage in the computing system of FIG. 1, in accordance with an embodiment of the present disclosure.

To help illustrate, an example of a process 62 for predictively controlling data storage is described in FIG. 5. Generally, the process 62 includes determining historical data access information (process block 64) and predicting a subsequent data access pattern based on the historical data access information (process block 66). Additionally, the process 62 includes controlling data storage in memory levels based on the predicted data access pattern (process block 68).

Although described in a particular order, which represents a particular embodiment, it should be noted that the process 62 may be performed in any suitable order. Additionally, embodiments of the process 62 may omit process blocks and/or include additional process blocks. Moreover, in some embodiments, the process 62 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a (e.g., processor-side and/or memory-side) memory controller 34 may determine historical data access information (process block 64). For example, a processor-side (e.g., cache and/or pre-fetch) memory controller 34A may determine processor-side historical data access information 39A associated with one or more previous data (e.g., memory) accesses organized by transaction context. Additionally or alternatively, as will be described in more detail below, a memory-side (e.g., main) memory controller 34 may determine memory-side historical data access information 39 associated with one or more previous data (e.g., memory) accesses organized by transaction context.

Furthermore, in some embodiments, the historical data access information 39 may be stored in a tangible, non-transitory, computer-readable medium, such as static random-access memory (SRAM) implemented in or coupled to the (e.g., processor-side and/or memory-side) memory controller 34. Thus, in such embodiments, the memory controller 34 may retrieve the historical data access information 39 from the tangible, non-transitory, computer-readable medium. Moreover, as described above, in some embodiments, the historical data access information 39 may be organized by transaction context via a historical data access information table 69 that indicates entries 71 corresponding with different transaction context in different table sections 81.

Based at least in part on the historical data access information 39, the memory controller 34 may predict a data access pattern expected to occur during an upcoming control horizon (e.g., time period or one or more clock cycles) (process block 66). As described above, in some embodiments, historical data access information 39 may indicate what data was previously accessed (e.g., targeted or request), when the data was previously accessed, and/or an order with which the data was previously accessed. In other words, at least in such embodiments, the memory controller 34 may determine one or more previous data access patterns based at least in part on the historical data access information 39. Since data access patterns are often somewhat repetitive (e.g., cyclical), in some embodiments, the memory controller 34 may predict the subsequent data access pattern based at least in part on historical data access information 39 indicative of a previous data access pattern.

In particular, in some embodiments, the memory controller 34 may predict what data will be targeted during the upcoming control horizon, when the data will be targeted during the upcoming control horizon, and/or an order with which the data will be targeted during the upcoming control horizon. For example, when the historical data access information 39 indicates that a first data block and a second data block were targeted by a previous data access pattern, the memory controller 34 may predict that the first data block and the second data block will again be targeted by the subsequent data access pattern. Additionally or alternatively, when the historical data access information 39 indicates that the second data block was targeted after the first data block during the previous data access pattern, the memory controller 34 may predict that the second data block will again be targeted after the first data block during the subsequent data access pattern.

In other words, in some embodiments, the memory controller 34 may predict a next target data block relative to a currently or previously targeted data block. To help illustrate, continuing with the above example, the memory controller 34 may predict that the second data block will be the next target data block when the first data block is currently being targeted. In fact, in some embodiments, the historical data access information 39 may enable the memory controller 34 to predict that a data block, which was not accessed by the previous data access pattern, will be the next target data block. For example, when the historical data access information 39 indicates that a first (e.g., physical or virtual) memory address of the first data block and a second memory address of the second data block are separated by a stride length, the memory controller 34 may predict that a data block associated with a memory address that is the stride length away from the memory address of a currently targeted data block will be the next target data block.

Additionally or alternatively, in some embodiments, the memory controller 34 may more explicitly predict a next target time of one or more data blocks. For example, based at least in part on the difference between a last access time parameter associated with the first data block and a last access time parameter associated with the second data block, the memory controller 34 may determine a time difference between previous targeting of the first data block and the second data block and, thus, predict that the next target time of the second data block will occur the time difference after another targeting of the first data block. Additionally or alternatively, the memory controller 34 may determine an average period between successive accesses of a data block at least in part by dividing the difference between a last access time parameter and a write time parameter associated with the data block by an access count parameter associated with the data block. As such, the memory controller 34 may predict that the next target time of the data block will occur the average period after a previous targeting of the data block.

However, at least in some instances, predicting a subsequent data access pattern based solely on chronological data access information may result in the subsequent data access pattern being improperly predicted. To help illustrate, continuing with the above example, an application running in the computing system 10 may result in the first data block being targeted and the second data block subsequently being targeted. However, between targeting of the first data block and the second data block, a system interrupt independent of the specific application may result in a Jth (e.g., different) data block being targeted.

Thus, at least in some instances, predicting the subsequent data access pattern without regard for transaction context may result in the memory controller 34 predicting that, after another targeting of the first data block, the Jth data block will be the next targeted data block. However, since independent of the specific application, the system interrupt may not always occur between targeting of the first data block and targeting of the second data block. In other words, when the system interrupt does not occur during the upcoming control horizon, equally weighting the historical data access information 39 associated with the first data block, the second data block, and the Jth data block may result in the subsequent data access pattern being improperly predicted, for example, such that the second data block is predicted to be targeted at a time later that its actual target time. At least in some instances, determining a predicted next target time that is much later than an actual next target time of a data may reduce computing system operational efficiency, for example, due to the computing system 10 not having sufficient notice before the actual targeting to store an instance of the data block in lower memory (e.g., cache) level and, thus, the data block instead being retrieved from a higher memory level.

Additionally, as described above, a lower memory level may generally be implemented with less storage capacity compared to a higher memory level. Thus, as will be described in more detail below, in some embodiments, the lower memory level may evict a data block that is not expected to be targeted during an upcoming control horizon to make room for storage of another data block that is expected to be targeted during the upcoming control horizon. However, evicting the other data block based on a predicted next target time that occurs much earlier than the actual target time of the data block may result in the other data block being evicted too soon, which, at least in some instances, may reduce computing system operational efficiency, for example, due to the other data block actually being targeted before the data block and, thus, the other data block being retrieved from a higher memory level instead of a lower memory level.

To facilitate improving prediction accuracy, in some embodiments, the memory controller 34 may predict a subsequent data access pattern by analyzing historical data access information 39 in view of corresponding transaction contexts. In particular, in some embodiments, the memory controller 34 may determine multiple data access patterns, for example, each associated with a different transaction context (e.g., one or more aspects of a computing system 10). As an illustrative example, the memory controller 34 may determine a first (e.g., application) data access pattern associated with the first transaction context based at least in part on the historical data access information 39 indicated in one or more entries 71 of the first table section 81A.

Additionally, the memory controller 34 may determine an Ith (e.g., system interrupt) data access pattern associated with the Ith transaction context based at least in part on the historical data access information 39 indicated in one or more entries 71 of the Ith table section 81I.

In this manner, the memory controller 34 may predict a subsequent data access pattern of a transaction context based at least in part on a previous data access pattern associated with the transaction context. In other words, in some embodiments, considering context information in the prediction of a subsequent data pattern corresponding with a specific transaction context may enable the memory controller 34 to adaptively (e.g., dynamically) adjust influence of historical data access information 39 associated with different data blocks in its prediction. At least in some embodiments, this may facilitate improving prediction accuracy, for example, by enabling the memory controller 34 to filter out noise, such as historical data access information 39 associated with a data block unrelated to the specific aspect transaction context, which may otherwise affect its prediction. As an illustrative example, in predicting the subsequent data access pattern associated with the first transaction context, the memory controller 34 may more heavily weight the historical data access information 39 associated with the first data block and the second data block compared to the historical data access information 39 associated with the Jth data block, for example, such that the historical data access information 39 associated with the Jth data block is excluded from the prediction.

To facilitate improving computing system operational efficiency, as described above, the memory controller 34 may predictively control data storage in one or more memory levels based at least in part on the predicted data access pattern (process block 68). In particular, in some embodiments, the memory controller 34 may control what data blocks are stored in a memory level based at least in part on a predicted access order of the data blocks and/or a next predicted target time of the data blocks. For example, the memory controller 34 may pre-fetch a copy (e.g., instance) of a data block expected to be targeted during an upcoming control horizon from a higher memory level into a lower (e.g., lowest or L1) memory level before the data block is actually targeted (process block 78). Additionally or alternatively, the memory controller 34 may preemptively (e.g., predictively) instruct a lower memory level to evict a data block, for example, when the data block is not expected to be targeted during an upcoming control horizon to make room for another data block that is expected to be targeted during the upcoming control horizon (process block 80). In this manner, a (e.g., processor-side and/or memory-side) memory controller 34 may operate to predictively control data storage in one or more memory levels in a computing system 10 (e.g., processing sub-system 12 and/or memory sub-system 14) based at least in part on context information associated with one or more previous data accesses.

As described above, in some embodiments, context information may be available in a processing sub-system 12 of a computing system 10, for example, since processing circuitry 16 in the processing sub-system 12 generates and/or targets the data blocks. In other words, in such embodiments, the context information may be directly available to a processor-side memory controller 34A, thereby enabling the processor-side memory controller 34A to predictively control data storage in one or more memory (e.g., cache) levels of the processing sub-system 12 based at least in part on the context information. However, in some embodiments, the context information may not be directly available to a memory sub-system 14 in the computing system 10. Accordingly, to facilitate improving prediction accuracy in the memory sub-system 14, at least in such embodiments, the processing sub-system 12 may indicate the context information in a memory access request output to the memory sub-system 14 via a memory bus 20B.

Figure 6:
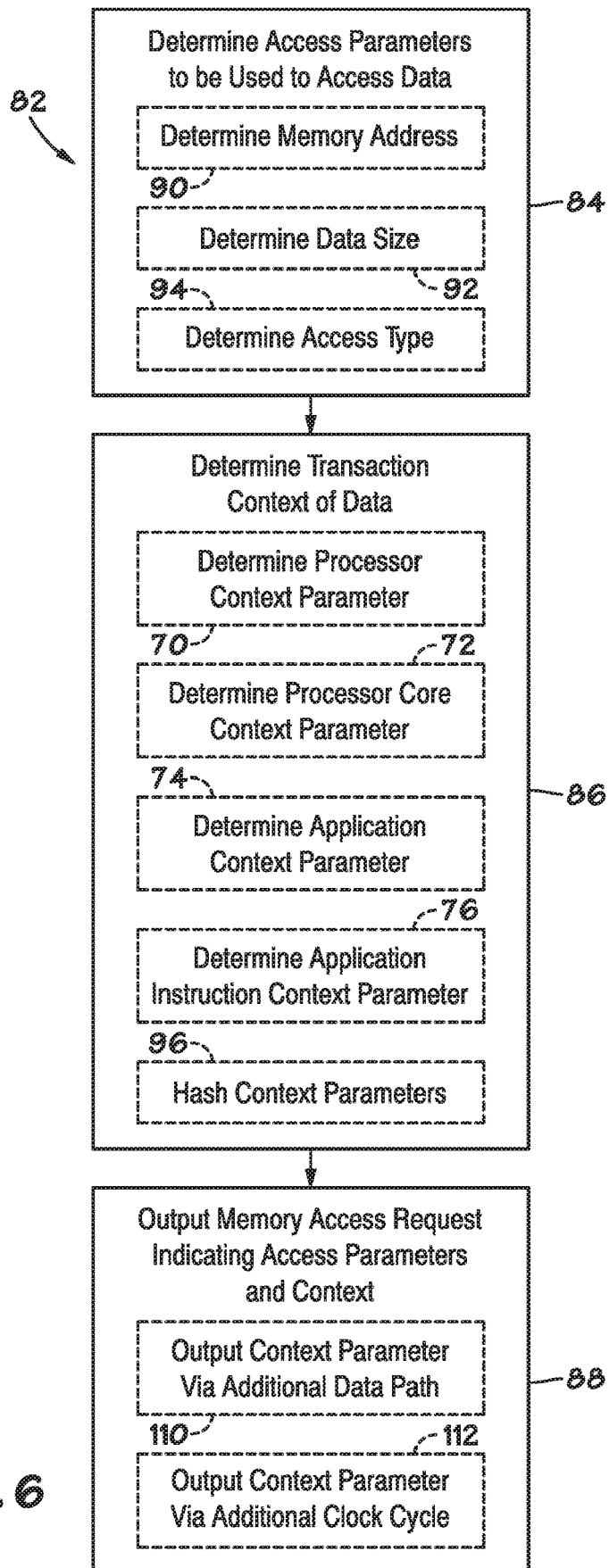
FIG. 6 is a flow diagram of an example process for requesting access to the memory sub-system of FIG. 1, in accordance with an embodiment of the present disclosure.

To help illustrate, an example of a process 82 for operating a processing sub-system 12 to request access to a memory sub-system 14 is described in FIG. 6. Generally, the process 82 includes determining access parameters to be used to access data (process block 84) and determining transaction context of the data (process block 86). Additionally, the process 82 includes outputting a memory access request indicating the access parameters and the context (process block 88).

Although described in a particular order, which represents a particular embodiment, it should be noted that the process 82 may be performed in any suitable order. Additionally, embodiments of the process 82 may omit process blocks and/or include additional process blocks. Moreover, in some embodiments, the process 82 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a processor-side memory controller 34A may determine access parameters to be used to access data (process block 84). In some embodiments, determining the access parameters may include determining a memory address associated with the data (process block 90). For example, when a data block is to be stored in a memory sub-system 14, write access parameters may include a virtual memory address used by processing circuitry 16 to identify the data block and/or a physical memory address in the memory sub-system 14 at which to store the data block. Additionally or alternatively, when a data block is to be retrieved from a memory sub-system 14, read access parameters may include a virtual memory address used by processing circuitry 16 to identify the data block and/or a physical memory address in the memory sub-system 14 at which the data block is expected to be stored. In some embodiments, the processor-side memory controller 34A may also determine a tag parameter value associated with the data based at least in part on the virtual memory address of the data and/or the physical memory address of the data.

Additionally, in some embodiments, determining the access parameters may include determining size (e.g., bit-depth) of the data (process block 92). For example, when a data block is to be stored in a memory sub-system 14, write access parameters may indicate size of the data block. Additionally or alternatively, when a data block is to be retrieved from a memory sub-system 14, read access parameters may indicate expected size of the data block.

Furthermore, in some embodiments, determining the access parameters may include determining an access type (process block 94). For example, when a data block is to be stored in a memory sub-system 14, write access parameters may include a write enable indicator (e.g., bit). Additionally or alternatively, when a data block is to be retrieved from a memory sub-system 14, read access parameters may include a read enable indicator (e.g., bit).

To facilitate improving prediction accuracy in the memory sub-system 14, the processor-side memory controller 34A may determine transaction context associated with the data to be stored in and/or retrieved from the memory sub-system 14 (process block 86). As described above, in some embodiments, transaction context associated with a data access may be indicated via context information (e.g., one or more parameters) that identifies one or more aspects of the computing system associated with (e.g., that generated and/or targeted) a data block and/or a (e.g., physical and/or virtual) memory address targeted by the data access. For example, the context information may include a processor context parameter, a processor core context parameter, an application (e.g., program or thread) context parameter, and/or an application instruction (e.g., program counter) context parameter.

Thus, in some embodiments, determining the transaction context of a data access may include determining a processor context parameter, which identifies one or more processors in the computing system 10 (process block 70). For example, the processor-side memory controller 34A may determine the value of the processor context parameter to identify a processor in the computing system 10 that generated a data block. Additionally or alternatively, the processor-side memory controller 34A may determine the value of the processor context parameter to identify a processor that is currently targeting and/or that previously targeted a data block.

In some embodiments, determining the transaction context of a data access may additionally or alternatively include determining a processor core context parameter, which identifies one or more processor cores 36 in the computing system 10 (process block 72). For example, the processor-side memory controller 34A may determine the value of the processor core context parameter to identify a processor core 36 in the computing system 10 that generated a data block. Additionally or alternatively, the processor-side memory controller 34A may determine the value of the processor core context parameter to identify a processor core 36 that is currently targeting and/or that previously targeted a data block.

Furthermore, in some embodiments, determining the transaction context of a data access may additionally or alternatively include determining an application (e.g., program or thread) context parameter, which identifies one or more applications in the computing system 10 (process block 74). For example, the processor-side memory controller 34A may determine the value of the application context parameter to identify an application, which when run in the computing system 10, resulted in generation of a data block. Additionally or alternatively, the processor-side memory controller 34A may determine the value of the application context parameter to identify an application, which when run in the computing system 10, resulted in a current targeting and/or a previous targeting of a data block.

Moreover, in some embodiments, determining the transaction context of a data access may additionally or alternatively include determining an application instruction (e.g., program counter) context parameter, which identifies one or more application instructions in the computing system 10 (process block 76). For example, the processor-side memory controller 34A may determine the value of the application instruction context parameter to identify an application instruction, which when executed by the computing system 10, resulted in generation of a data block. Additionally or alternatively, the processor-side memory controller 34A may determine the value of the application instruction context parameter to identify an application instruction, which when executed by the computing system 10, resulted in a current targeting and/or a previous targeting of a data block. However, as described above, at least in some embodiments, including one or more context parameters in a memory access request may increase the total number of bits used to indicate the memory access request.

To facilitate accommodating the increased number of bits, as will be described in more detail below, in some embodiments, a memory interface implemented in the computing system 10 may be adjusted, for example, to increase communication bandwidth provided by the memory interface and/or to increase the number of clock cycles during which the memory access request is transmitted. However, at least in some instances, adjusting the memory interface may affect implementation associated cost and/or operational efficiency of the computing system 10, for example, due to increasing the number of clock cycles delaying the response of its memory sub-system 14 and/or due to increasing the communication bandwidth increasing component count and/or physical footprint of the memory interface.

To facilitate reducing the effect inclusion of one or more context parameters has on implementation associated cost and/or computing system operational efficiency, in some embodiments, the processor-side memory controller 34A may hash the value of one or more of the context parameters before output to the memory bus 20B. In other words, in some embodiments, the processor-side memory controller 34A may pass the value of one or more context parameters through a hash function to determine a hashed context parameter that has a fixed bit-length (e.g., bit-depth). In fact, in some embodiments, performing a hash operation (e.g., function) on the value of context parameters may enable different types and/or different number of context parameters to be included in different memory access requests, for example, due to the hash operation outputting hashed context parameters with the same bit-length regardless of the inputs thereto.

However, at least in some instances, hashing context parameters may result in some amount of loss in precision compared to directly (e.g., explicitly) indicating the context parameters, for example, due to different sets of context parameter values being inadvertently hashed to the same hashed context parameter value. As an illustrative example, the processor-side memory controller 34A may pass the value of a first application instruction (e.g., program counter) context parameter to be included in a first memory access request through a hash function to determine a first hashed context parameter. Additionally, the processor-side memory controller 34A may pass the value of a second application instruction context parameter to be included in a second memory access request through the same hash function to determine a second hashed context parameter. However, at least in some instances, even when the values of the first application instruction context parameter and the second application instruction context parameter identify different application instructions, the hash function may result in the first hashed context parameter value and the second hashed context parameter value being the same. In other words, at least in such instances, hashing the context parameters may affect the ability of the memory sub-system 14 to properly interpret context information indicated in memory access requests and, thus, precision with which the context information is indicated in the memory access requests.

In some embodiments, the loss of precision may be dependent at least in part on the applied hash function. In other words, in some embodiments, the resulting precision loss may vary between different hash functions. In fact, to facilitate reducing the effect hashing has on the ability of the memory sub-system 14 to properly interpret context information, in some embodiments, the processor-side memory controller 34A may selectively implement different hash functions. For example, the processor-side memory controller 34A may hash a first one or more context parameters to be included in a first memory access request using a first hash function and hash a second one or more context parameters to be included in a second memory access request using a second (e.g., different) hash function.

Thus, to facilitate proper interpretation of a hashed context parameter included in a memory access request, in some embodiments, the processor-side memory controller 34A may also identify the hash function used to generate the hashed context parameter value in the memory access request. In other words, in some embodiments, a memory access request may include one or more context parameters that indicate context of another context parameter included in the memory access request. For example, the memory access request may include a hash function context parameter, which identifies one or more hash functions used to generate a hashed context parameter included in the memory access request.

Additionally or alternatively, to facilitate varying the types of context parameters included in different memory access requests, a memory access request may include a context type context parameters, which identifies a context parameter type of one or more other context parameters included in the memory access request. For example, a first memory access request may include a first context type context parameter, which indicates that the first memory access request includes a processor context parameter. On the other hand, a second memory access request may include a second context type context parameter, which indicates that the second memory access request includes an application instruction context parameter.

Based at least in part on the context parameters and the access parameters, the processor-side memory controller 34A may instruct the processing sub-system 12 to output a memory access request to the memory sub-system 14 via a memory bus 20B (process block 88). To facilitate proper interpretation of the various parameters, in some embodiments, memory access requests may be organized into one or more parameter fields, for example, in accordance with a communication protocol used by a memory interface communicative coupled between the processing sub-system 12 and the memory sub-system 14. In other words, at least in such embodiments, a memory access request may include one or more parameter fields, which may each be used to indicate the value of a corresponding parameter.

Figure 7:
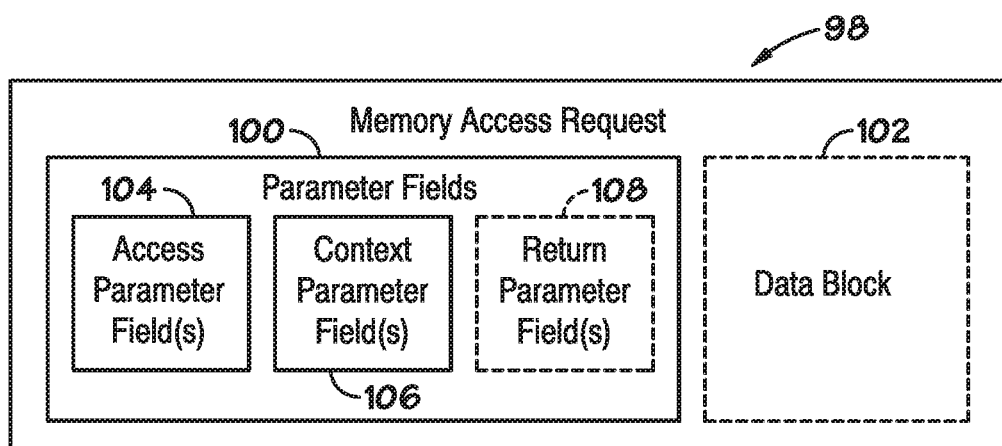
FIG. 7 is a diagrammatic representation of an example memory access request output from the process sub-system of FIG. 2, in accordance with an embodiment of the present disclosure.

To help illustrate, an example of a memory access request 98 is shown in FIG. 7. As depicted, the memory access request 98 includes multiple parameter fields 100. In some embodiments, the memory access request 98 may additionally include a data block 102, for example, when the memory access request 98 is a write (e.g., store) memory access request 98. However, it should be appreciated that the depicted example is merely intended to be illustrative and not limiting. For example, the memory access request 98 may not include a data block 102 when the memory access request 98 is a read (e.g., load) memory access request 98.

In any case, as in the depicted example, the memory access request 98 may include one or more access parameter fields 104, which may each be used to indicate the value of a corresponding access parameter. In particular, in some embodiments, a memory access request 98 may include a first (e.g., access type) access parameter field 104, which may be used to indicate the type (e.g., read or write) of memory access being requested. For example, by indicating that write (e.g., store) access is being requested, an access type access parameter may identify the memory access request 98 as a write memory access request 98. On the other hand, by indicating that read (e.g., load) access is being requested, an access type access parameter identify the memory access request 98 as a read memory access request 98.

Additionally, in some embodiments, a memory access request 98 may include a second (e.g., memory address) access parameter field 104, which may be used to indicate a (e.g., physical and/or virtual) memory address to which access is being requested. For example, in a write memory access request, an address access parameter may be used to indicate a virtual memory address used by processing circuitry 16 to identify the data block 102 and/or a physical memory address in the memory sub-system 14 at which the data block 102 is to be stored. On the other hand, in a read memory access request, an address access parameter may be used to indicate a virtual memory address used by processing circuitry to identify a data block 102 requested for retrieval and/or a physical memory address in the memory sub-system 14 at which the data block 102 requested for retrieval is currently store.

Furthermore, in some embodiments, a memory access request 98 may include a third (e.g., size) access parameter field 104 used to indicate size (e.g., bit-depth) of associated data, for example, requested for storage in the memory sub-system 14 and/or requested for return to the processing sub-system 12. In other words, in some embodiments, a size access parameter in a write memory access request may be used to indicate the size of the data block 102 to be stored in the memory sub-system 14. On the other hand, a size access parameter in a read memory access request may be used to indicate the size of a data block 102 requested for retrieval from the memory sub-system 14.

As in the depicted example, the memory access request 98 may additionally include one or more context parameter fields 106, which may each be used to indicate the value of a corresponding context parameter. In particular, in some embodiments, a memory access request 98 may include a first (e.g., processor) context parameter field 106, which may be used to specifically identify one or more processors in the computing system 10. For example, in a write memory access request, a processor context parameter may be used to identify a processor in the computing system 10 that generated the data block 102. On the other hand, in a read memory access request, a processor context parameter in a read memory access request may be used to identify a processor in the computing system 10 that is currently targeting the data block 102.

Additionally, in some embodiments, a memory access request 98 may include a second (e.g., processor core) context parameter field 106, which may be used to specifically identify a one or more processor cores 36 in the computing system 10. For example, in a write memory access request, a processor core context parameter may be used to identify a processor core 36 in the computing system 10 that generated the data block 102. On the other hand, in a read memory access request, a processor core context parameter in a read memory access request may be used to identify a processor core 36 in the computing system 10 that is currently targeting the data block 102.

Furthermore, in some embodiments, a memory access request 98 may include a third (e.g., application) context parameter field 106, which may be used to specifically identify one or more applications (e.g., program) in the computing system 10. For example, in a write memory access request, an application context parameter may be used to identify an application in the computing system 10 that resulted in generation of the data block 102. On the other hand, in a read memory access request, an application context parameter may be used to identify an application in the computing system 10 that resulted in the data block 102 currently being targeted.

Moreover, in some embodiments, a memory access request 98 may include a fourth (e.g., application instruction) context parameter field 106, which may be used to identify a specific application instruction (e.g., program counter) in an application run in the computing system 10. For example, in a write memory access request, an application instruction context parameter may be used to identify an application instruction that resulted in generation of the data block 102 when executed by the computing system 10. On the other hand, in a read memory access request, an application instruction context parameter may be used to identify an application instruction executed by the computing system 10 that resulted in the data block 102 currently being targeted.

In some embodiments, a memory access request 98 may include one or more parameter fields 100 other than the access parameter fields 104 and the context parameter fields 106. For example, the parameter fields 100 may include one or more fulfillment parameter field 108, which may each be used to indicate the value of a corresponding fulfillment parameter. In some embodiments, fulfillment parameters may include a priority parameter, which indicates fulfillment priority of the memory access request 98, and/or a cache bypass parameter. In some embodiments, a cache bypass parameter included in a read memory access request 98 may indicate whether an instance of a target data block 102 retrieved from a higher memory level should be stored in a lower (e.g., cache) memory level. Additionally or alternatively, a cache bypass parameter included in a write memory access request 98 may indicates whether an instance of a target data block 102 to be stored in a higher memory level should also be stored in a lower (e.g., cache) memory level. Thus, at least in such embodiments, a memory access request 98 may include a first (e.g., cache bypass) fulfillment parameter field 108, which may be used to indicate the value of a cache bypass parameter, and/or a second (e.g., priority) fulfillment parameter field 108, which may be used to indicate the value of a priority parameter. In this manner, a memory access request 98 (e.g., generated by processor-side memory controller 34A) may be formatted to indicate associated context information, for example, via one or more context parameters indicated in corresponding context parameter fields 106 of the memory access request 98.

Returning to the process 82 of FIG. 6, after generation of a memory access request 98, in some embodiments, the processor-side memory controller 34 may store the memory access request 98 in a request (e.g., command) queue 42. In other words, at least in such embodiments, one or more memory access requests 98 may be stored in entries of the request queue 42 before transmission from the processing sub-system 12 to the memory sub-system 14 via a memory interface implemented in the computing system 10. Additionally, as described above, in some embodiments, the memory interface may include a processor-side bus interface 32A implemented in the processing sub-system 12, a memory-side bus interface 32 implemented in the memory sub-system 14, a memory bus 20B coupled between pins 44 of the processor-side bus interface 32A and pins 44 of the memory-side bus interface 32. In other words, at least in such embodiments, a memory access request may be retrieved from the request queue 42 and output from the processing sub-system 12 to the memory bus 20B via the processor-side bus interface 32A.

Furthermore, as described above, at least in some embodiments, including one or more context parameters in a memory access request 98 may result in the total number of bits used to indicate the memory access request 98 increasing. To facilitate accommodating the increase in the total number of bits, as will be described in more detail below, in some embodiments, the memory interface used to communicate memory access requests 98 from the processing sub-system 12 to the memory sub-system 14 may be adjusted. For example, to facilitate reducing the effect increasing the total number of bits has on computing system operational efficiency, the communication bandwidth provided by the memory interface may be increased (e.g., expanded). To facilitate increasing communication bandwidth, in some embodiments, the number of data paths provided by the memory interface may be increased. For example, the communication bandwidth may be increased by implementing an additional data path, which includes an additional wire in the memory bus 20B, an additional processor-side bus interface pin 44 coupled to the additional wire, and an additional memory-side bus interface pin 44 coupled to the additional wire.

In fact, in some embodiments, one or more data paths implemented in the memory interface may be dedicated to communication of specific context parameter fields 106. Thus, in some embodiments, outputting the memory access request 98 to the memory sub-system 14 may include outputting the value of a context parameter via an additional data path implemented in the memory interface (process block 110). At least in some instances, communicating a context parameter via an additional data path may facilitate reducing the effect inclusion of the context parameter has on computing system operational efficiency, for example, by enabling the context parameter to be communicate in parallel (e.g., concurrently) with an access parameter and/or another context parameter.

Additionally or alternatively, to facilitate reducing the effect increasing the total number of bits has on implementation associated cost, the communication protocol of the memory interface may be adjusted. For example, to facilitate accommodating an increase in the number of bits used to indicate a memory access request 98, the communication protocol may be adjusted to increase the number of clock cycles over (e.g., during) which the memory access request 98 is communicated (e.g., transmitted and/or received). In other words, in some embodiments, the communication protocol of the memory interface may be adjusted to add one or more clock cycles to facilitate accommodating the increase in the number of bits per memory access request 98.

In fact, in some embodiments, one or more clock cycles provided by the communication protocol of the memory interface may be dedicated to communication of specific context parameter fields 106. Thus, in some embodiments, outputting the memory access request 98 to the memory sub-system 14 may include outputting the value of a context parameter via an additional clock cycle provided by the memory interface (process block 112). At least in some instances, communicating a context parameter via an additional clock cycle may facilitate reducing the effect inclusion of the context parameter has on implementation associated cost, for example, by reducing and/or obviating expansion of the communication bandwidth provided by the memory interface. In addition to the memory interface, in some embodiments, implementation of the request queue 42 may be adjusted to facilitate accommodating memory access requests 98 including one or more context parameter fields 106 and/or a resulting increase in the number of bits per memory access request 98.

Figure 8:
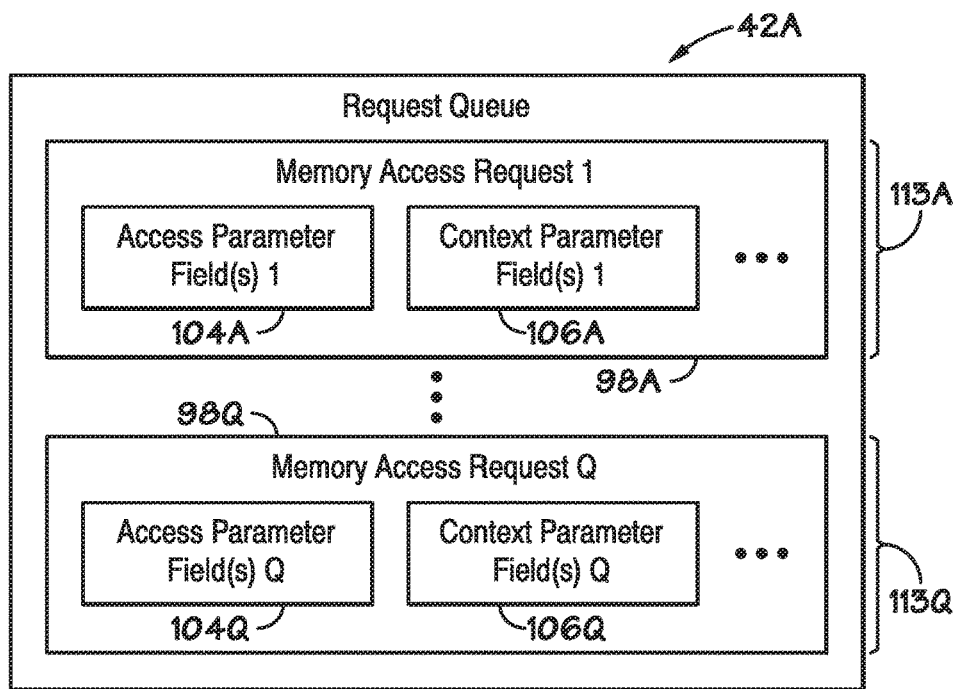
FIG. 8 is a diagrammatic representation of an example request queue implemented in the processing sub-system of FIG. 2, in accordance with an embodiment of the present disclosure.

To help illustrate, an example of a request queue 42A, which may be used to store one or more memory access requests 98 in a processing sub-system 12, is shown in FIG. 8. As in the depicted example, a request queue 42A may include multiple entries 113, which may each be used to queue (e.g., store) a memory access request 98. For example, a first entry 113A may be used to queue a first memory access request 98A and a Qth entry 113Q may be used to queue a Qth memory access request 98Q.

However, it should be appreciated that the depicted example is merely intended to be illustrative and not limiting. For example, in some embodiments, a request queue 42 may include a single entry 113 or more than two entries 113. Additionally or alternatively, one or more entries 113 in a request queue 42 may remain unpopulated (e.g., null or invalid), for example, when the request queue 42 includes more entries 113 than the number of memory access requests 98 that have not yet been output from processing sub-system 12 to a memory sub-system 14.

In any case, as in the depicted example, each memory access request 98 queued in the request queue 42 may include one or more access parameter fields 104 and one or more context parameter fields. For example, the first memory access request 98A may include a first one or more access parameter fields 104A and a first one or more context parameter fields 106A. On the other hand, the Qth memory access request 98Q may include a Qth one or more access parameter fields 104Q and a Qth one or more context parameter fields 106Q.

To facilitate improving operational flexibility, in some embodiments, the number of context parameter fields 106 and/or the type of context parameters included in different memory access requests 98 may vary. For example, the first memory access request 98A may include a single context parameter field 106 whereas the Qth memory access request 98Q includes four context parameter fields 106. Additionally or alternatively, a processor core context parameter may be indicated in a context parameter field 106 of the first memory access request 98A whereas the same context parameter field 106 in the Qth memory access request 98Q is used to indicate an application instruction context parameter.

However, as described above, including one or more context parameter fields 106 in a memory access request 98 may result in an increase in the number of bits used to indicate the memory access request 98. In other words, to enable the request queue 42A to queue memory access requests 98 including one or more context parameter fields 106, in some embodiments, bit-width of the entries 113 in the request queue 42A may be increased (e.g., expanded), for example, compared to another request queue 42 that is implemented to queue memory access requests 98 that only include access parameter fields 104. After a memory access request 98 is queued, in some embodiments, a processing sub-system 12 may retrieve (e.g., read) a corresponding entry 113 from its request queue 42 and output the memory access request 98 via a memory interface. As described above, a memory sub-system 14 coupled to the memory interface may then provide the processing sub-system 12 memory (e.g., data) access based at least in part on the value of one or more access parameter fields 104 included in the memory access request 98.

Figure 9:
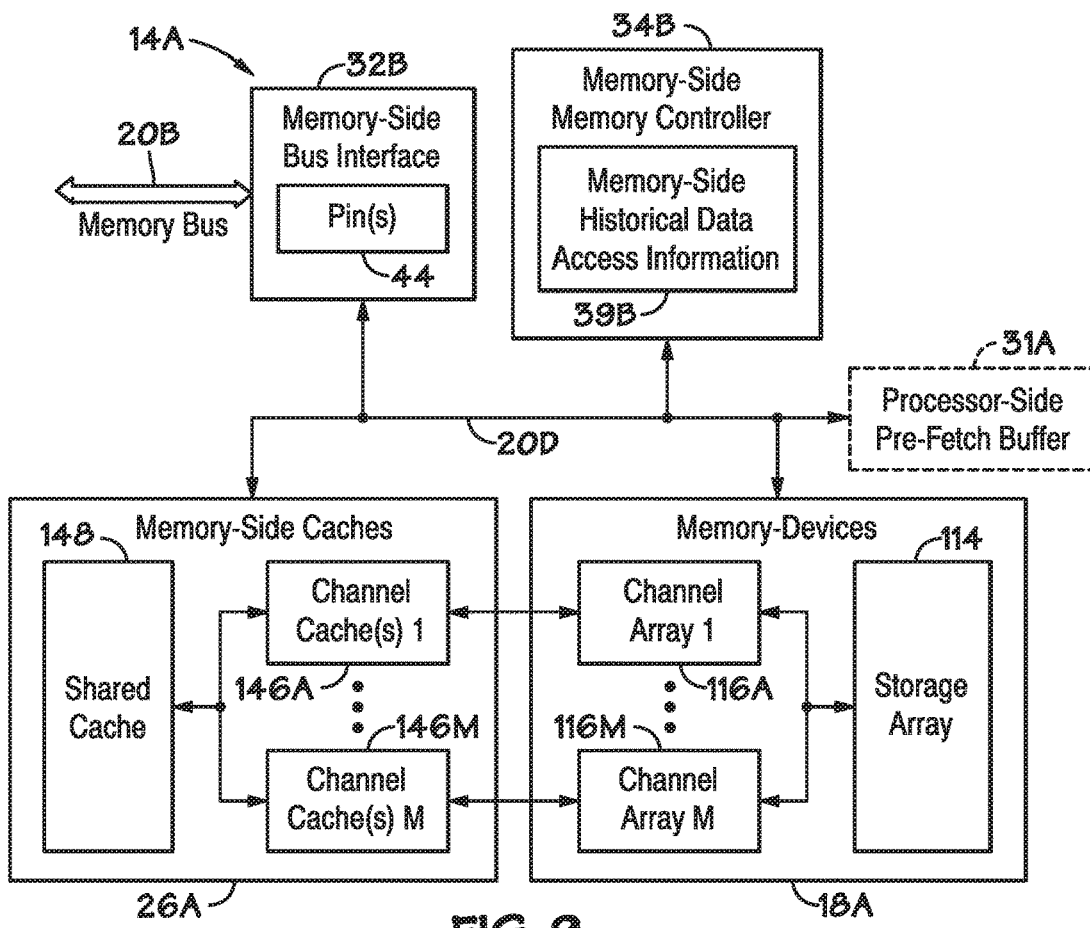
FIG. 9 is a block diagram of an example of the memory sub-system of FIG. 1, in accordance with an embodiment of the present disclosure.

To help illustrate, an example of a memory sub-system 14A, which includes a memory-side memory controller 34B, is shown in FIG. 9. As in the depicted example, a memory sub-system 14A may include memory-side caches 26A, a memory-side pre-fetch buffer 31, and memory devices 18A. However, it should be appreciated that the depicted example is merely intended to be illustrative and not limiting. For example, in other embodiments, the memory-side caches 26 and/or the memory-side pre-fetch buffer 31 may be obviated (e.g., optional) and, thus, not included in a memory sub-system 14.

In any case, as described above, in some embodiments, a memory sub-system 14 may include one or more non-volatile memory devices 18 and/or one or more volatile memory devices 18. Generally, a non-volatile memory device 18 may provide data storage using non-volatile memory. For example, a non-volatile memory device 18 may include a flash (e.g., NAND) memory device, a phase-change memory (e.g., 3D XPoint™) device, a ferroelectric random access memory (FeRAM) device, a solid state drive (SSD), a hard disk drive (HDD), or any combination thereof. On the other hand, a volatile memory device 18 may generally provide data storage using volatile memory. For example, a volatile memory device 18 may include a dynamic random-access memory (DRAM) device, a static random-access memory (SRAM) devices, or both.

Furthermore, in some embodiments, multiple memory devices 18 may be implemented on a memory module, such as a dual in-line memory module (DIMM) or a single in-line memory module (SIMM). For example, a memory module may include a printed circuit board (PCB) and multiple memory devices 18 disposed on a flat or planar (e.g., front or back) surface of the printed circuit board. Additionally, the memory devices 18 may be coupled to external pins formed along an (e.g., bottom) edge of the printed circuit board via conductive traces formed on the printed circuit board.

It should be appreciated that one or more of the memory devices 18 may be implemented using other packing techniques. For example, memory devices 18 may be coupled to a (e.g., silicon) interposer to implement a 2.5D configuration. Additionally or alternatively, memory devices 18 may be stacked to implement a 3D configuration. Furthermore, in some embodiments, memory devices 18 may be implemented using organic packaging techniques. In other words, the techniques described in the present disclosure may be implemented as an on-package solution.

In any case, as described above, different memory types generally provide varying tradeoffs that affect operational efficiency and/or implementation associated cost, such as component count, manufacturing steps, and/or physical footprint, of a memory sub-system 14 and, thus, a computing system 10 in which the memory sub-system 14 is implemented. For example, non-volatile memory generally provides higher (e.g., greater) data storage density compared to volatile memory. Additionally, non-volatile memory cells, in contrast to volatile memory cells, may maintain storage of data even while in an unpowered state. On the other hand, volatile memory generally provides faster data communication (e.g., read and/or write) speeds compared to non-volatile memory. In fact, static random-access memory (SRAM) generally provide faster data communication speeds compared to dynamic random-access memory (DRAM).

Thus, to facilitate improving data access speeds, in some embodiments, a volatile memory device 18 may be used to implement a lower (e.g., smaller and faster) memory level compared to a non-volatile memory device 18, for example, which implements a highest (e.g., largest and slowest) memory level. As described above, in some embodiments, memory cells in one or more memory devices 18 may be organized into a memory array 28 to implement a corresponding memory level. For example, non-volatile memory cells in the memory sub-system 14A may be organized into a storage memory array 114 corresponding with a storage (e.g., highest and/or non-volatile) memory level in the memory sub-system 14A.

Additionally, in some embodiments, volatile memory cells may be organized into one or more memory channel memory arrays 116, for example, each corresponding with a different memory (e.g., DRAM) channel. As an illustrative example, volatile memory cells in the memory sub-system 14A may be organized into a first memory channel memory array 116A corresponding with a first memory channel. Additionally or alternatively, volatile memory cells in the memory sub-system 14A may be organized into an Mth memory channel memory array 116M corresponding with an Mth memory channel. To facilitate predictively controlling data storage in a memory sub-system 14, in some embodiments, the memory sub-system 14 may store context information in a memory array 28A, for example, along with a corresponding data block 102 as a data object.

Figure 10:
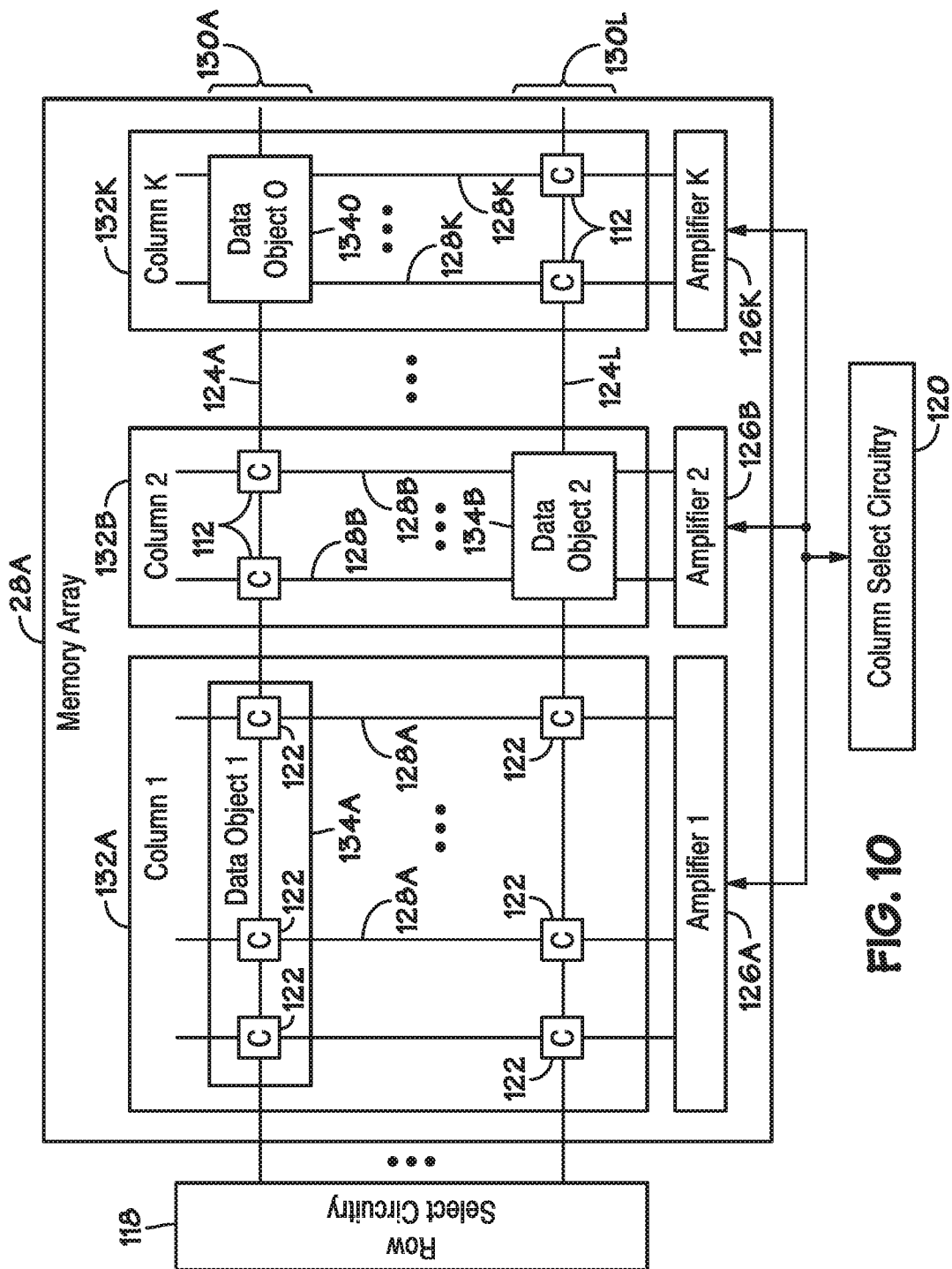
FIG. 10 is a block diagram of an example memory array implemented in the memory sub-system of FIG. 9, in accordance with an embodiment of the present disclosure.

To help illustrate, an example of a memory array 28A, which may be implemented in one or more memory devices 18, is shown in FIG. 10. As in the depicted example, the memory array 28A may be coupled to row select (e.g., decoder) circuitry 118 and column select (e.g., decoder) circuitry 120. Additionally, as in the depicted example, the memory array 28A may include memory cells 122 coupled to the row select circuitry 118 via word lines 124 formed in a first (e.g., horizontal) direction and to amplifier circuitry 126 via bit lines 128 formed in a second (e.g., vertical) direction.

In some embodiments, each memory cell 122 may include a switching component, such as a metal-oxide-semiconductor field-effect transistor (MOSFET), and a storage component, such as a capacitor. For example, a memory cell 122 may be implemented such that its MOSFET is coupled between a bit line 128 and its storage capacitor and the gate of its MOSFET is coupled to a word line 124. As such, in some embodiments, each memory cell 122 may be used to store one bit of data.

For example, a memory cell 122 may indicate a 1-bit when charge stored in the memory cell 122 results in a voltage greater than a threshold voltage. On the other hand, the memory cell 122 may indicate a 0-bit when charge stored in the memory cell 122 results in a voltage less than the threshold voltage. In other embodiments, a memory cell 122 may be implemented to store multiple bits of data. For example, a memory cell 122 in Quad-Level Cell (QLC) NAND memory may be implemented to store two bits of data.

In any case, as in the depicted example, the memory cells 122 may be organized into one or more memory cell rows 130, which may each be identified by a corresponding row address (e.g., physical memory address), and one or more memory cell columns 132, which may each be identified by a corresponding column address (e.g., physical memory address). In some embodiments, a memory cell row 130 may include each of the memory cells 122 coupled to a (e.g., one) word line 124. For example, a first memory cell row 130A may include each of the memory cells 122 coupled to a first word line 124A and an Lth memory cell row 130L may include each of the memory cells 122 coupled to an Lth word line 124L.

As in the depicted example, organizing the memory array 28A in this manner may enable memory cells 122 to be grouped into storage locations each suitable for storage of a data object 134. For example, a first data object 134A may be stored at a first storage location including the memory cells 122 in the first memory cell row 130A and a first memory cell column 132A, a second data object 134B may be stored at a second storage location including the memory cells 122 in an Lth memory cell row 130L and a second memory cell column 132B, and an Oth data object 134O may be stored at an Oth storage location including the memory cells 122 in the first memory cell row 130A and the Kth memory cell column 132K. In some embodiments, a data object 134 may include a data block 102 as well as associated metadata, for example, which identifies context information associated with the data block 102.

Figure 11:
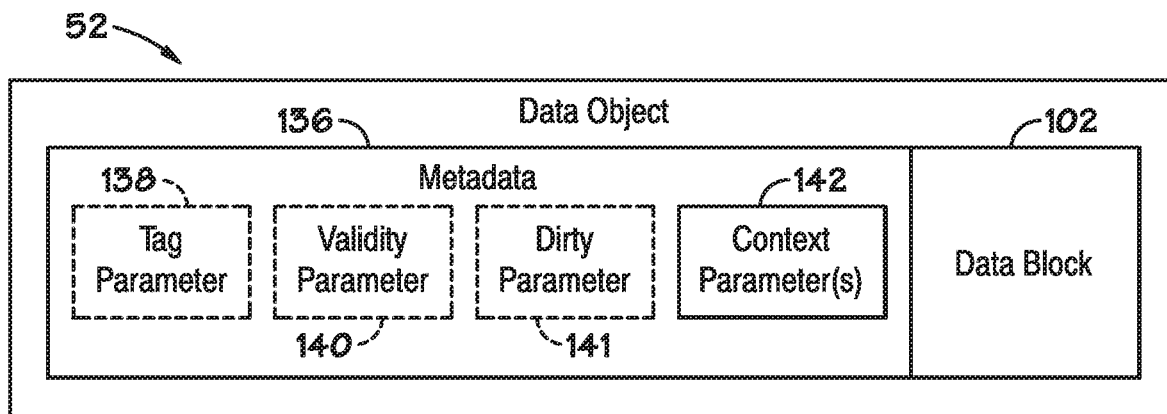
FIG. 11 is a diagrammatic representation of an example data object including a data block and one or more context parameters indicative of a transaction context associated with the data block, in accordance with an embodiment of the present disclosure.

To help illustrate, an example of a data object 134 is shown in FIG. 11. As in the depicted example, a data object 134 may include metadata 136 concatenated in front of (e.g., prepended to) a data block 102. However, it should be appreciated that the depicted example is merely intended to be illustrative and not limiting. For example, in other embodiments, the metadata 136 may be concatenated behind (e.g., appended to) the data block 102 or otherwise associated (e.g., multiplexed and/or interleaved) with the data block 102.

In any case, a data block 102 generally includes related data, for example, which is expected to be processed (e.g., analyzed and/or interpreted) together. To facilitate identifying the data block 102, as in the depicted example, the metadata 136 may include a tag parameter 138. In some embodiments, the tag parameter 138 may be indicative of the storage location of the data block 102 and/or the data object 134 in an address space and, thus, may be used to identify the data block 102 and/or the data object 134. In other words, in some embodiments, the tag parameter 138 may indicate a virtual memory address of the data block 102, a physical memory address of the data block 102, or a value determined based on the virtual memory address and the physical memory address of the data block 102.

Additionally, as in the depicted example, the metadata 136 may include a validity parameter 140, which is indicative of validity of the data block 102. In some embodiments, the validity parameter 140 may include a validity bit, which indicates that the data block is valid when set (e.g., "1" bit or high) and invalid when not set (e.g., "0" bit or low). Additionally or alternatively, the validity parameter 140 may facilitate detecting whether the data block 102 is valid and/or correcting the data block 102 when invalid. For example, the validity parameter 140 may include one or more error checking codes, such as an inversion bit, a poison bit, a parity bit, an error-detecting code (EDC), an error-correcting code (ECC), a Bose-Chaudhuri-Hocquenghem (BCH) code, a message authentication code (MAC), a cyclic redundancy check (CRC) code, or any combination thereof.

Furthermore, as in the depicted example, the metadata 136 may include a dirty parameter 141, which indicates whether the data block 102 has been modified relative to a version stored in a higher memory level. In some embodiments, the dirty parameter 141 may include a dirty bit, which indicates that the data block is has been modified when set (e.g., "1" bit or high) and that the data block is has not been modified when not set (e.g., "0" bit or low). In other words, at least in such embodiments, the dirty parameter 141 may be toggled when the data block 102 is initially modified relative to a version of the data block 102 stored in a higher memory level.

Moreover, as in the depicted example, the metadata 136 may include one or more context parameters 142, which identify context information indicative of a transaction context with the data block 102. For example, the metadata 136 may include a processor context parameter 142, which identifies a processor that generated the data block 102, a processor that is currently targeting the data block 102, a processor that previously targeted the data block 102, and/or a processor that is expected to subsequently target the data block 102. Additionally, in some embodiments, the metadata 136 may include a processor core context parameter 142, which identifies a processor core 36 that generated the data block 102, a processor core 36 that is currently targeting the data block 102, a processor core 36 that previously targeted the data block 102, and/or a processor core 36 that is expected to subsequently target the data block 102.

Furthermore, in some embodiments, the metadata 136 may include an application context parameters 142, which identifies an application (e.g., program or thread) that resulted in generation of the data block 102, an application that resulted in the data block currently being targeted, an application that resulted in the data block previously being targeted, and/or an application that is expected to result in the data block subsequently being targeted. Moreover, in some embodiments, the metadata 136 may include an application instruction context parameter 142, which identifies an application instruction (e.g., program counter) that resulted in generation of the data block 102, an application instruction that resulted in the data block 102 currently being targeted, an application instruction that resulted in the data block 102 previously being targeted, and/or an application instruction that is expected to result in the data block 102 subsequently being targeted. In this manner, a data block 102 may be associated with metadata 136, which is indicative of transaction context of the data block 102, as a data object 134.

Returning to the memory array 28A of FIG. 10, as described above, data (e.g., data objects 134) may be stored at and/or retrieved from storage locations in the memory array 28A. Additionally, as described above, row select circuitry 118 may be connected to rows of the memory array 28A via corresponding word lines 124. Thus, to enable reading and/or writing a memory cell 122, row select circuitry 118 may activate the memory cell 122, for example, by outputting an activation (e.g., logic high) signal via a corresponding word line 124 that causes the switching component of the memory cell 122 to electrically couple the storage component of the memory cell 122 to a corresponding bit line 128.

Moreover, as described above, column select circuitry 120 may be coupled to columns of the memory array 28A. In other words, the column select circuitry 120 may be coupled to the first memory cell column 132A via the first bit lines 128A and first amplifier circuitry 126A, the second memory cell column 132B via second bit lines 128B and second amplifier circuitry 126B, and the Kth memory cell column 132K via the Kth bit lines 128K and Kth amplifier circuitry 126K. In some embodiments, amplifier circuitry 126 may include a driver that facilitates storing (e.g., writing) data into the memory cells 122 and/or a sense amplifier that facilitates outputting (e.g., reading) data from the memory cells 122.

Additionally, in some embodiments, the column select circuitry 120 may selectively enable reading from and/or writing to a memory cell column 132, for example, by outputting a column select signal (e.g., logic high) to corresponding amplifier circuitry 126. In other words, to read data (e.g., first data object 134A) from and/or to write data to the first memory cell column 132A, the column select circuitry 120 may output a column select signal to the first amplifier circuitry 126A. Similarly, to read data (e.g., second data object 134B) from and/or to write data to the second memory cell column 132B, the column select circuitry 120 may output a column select signal to the second amplifier circuitry 126B. Furthermore, to read data (e.g., Oth data object 134O) from and/or to write data to the Kth memory cell column 132K, the column select circuitry 120 may output a column select signal to the Kth amplifier circuitry 126K. In this manner, memory cells 122 in one or more memory devices 18 may be organized to implement a memory array 28 in a memory sub-system 14.

Returning to the memory sub-system 14A of FIG. 9, as described above, in addition to memory devices 18, in some embodiments, the memory sub-system 14A may include one or more memory-side caches 26A. As described above, a memory-side cache 26 may be implemented in a memory sub-system 14 to provide a lower memory level compared to a memory array 28 implemented in the memory sub-system 14. In other words, in some embodiments, a memory-side cache 26 may be implemented to, on average, provide faster data communication speed compared to a memory array 28.

Thus, in some embodiments, a memory-side cache 26 may also be implemented using volatile memory. For example, the memory-side cache 26A may be implemented with static random-access memory (SRAM) while a volatile memory devices 18 is implemented with dynamic random-access memory (DRAM). Additionally or alternatively, the memory-side cache 26A and the volatile memory device 18 may be implemented using the same memory type (e.g., DRAM). In fact, in some embodiments, one or more memory-side caches 26 may be implemented in a volatile memory device 18. In any case, as described above, a cache may be implemented to provide storage locations organized into one or more cache lines 30, for example, to store an instance (e.g., copy) of data also stored in a memory array 28.

Figure 12:
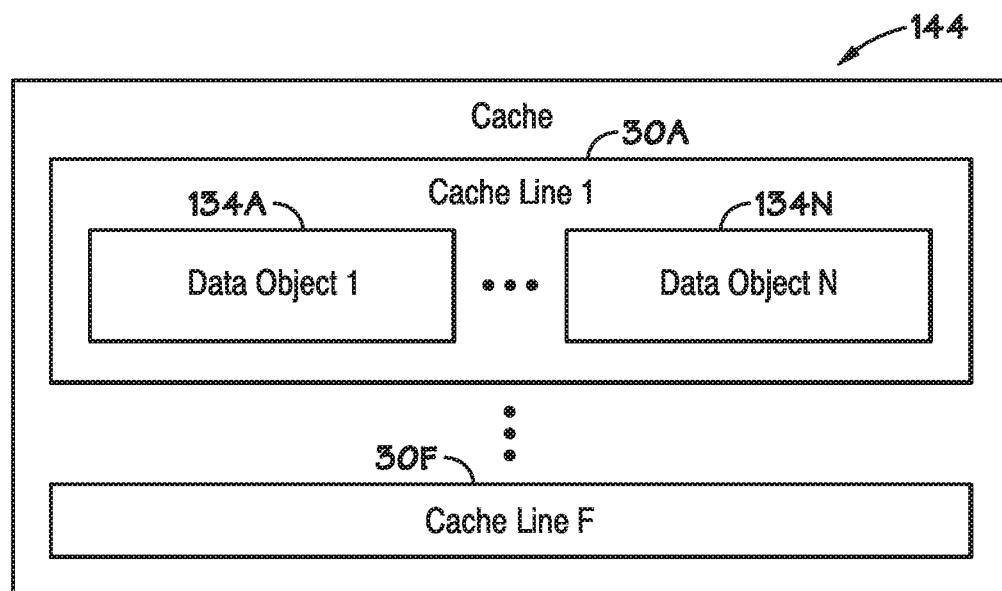
FIG. 12 is a block diagram of an example cache implemented in the computing system of FIG. 1, in accordance with an embodiment of the present disclosure.

To help illustrate, an example of a cache 144 (e.g., memory-side cache 26 and/or processor-side cache 24) is shown in FIG. 12. As in the depicted example, a cache 144 may provide storage locations organized into multiple cache lines 30—namely a first cache line 30A, an Fth cache line 30F, and so on. Additionally, as in the depicted example, storage locations included in a cache line 30 may be allocated to enable storage of one or more data objects 134 (e.g., 134A-134N). For example, the first cache line 30A may be implemented with a line width that enables storage of N valid data objects 134. However, it should be appreciated that the depicted example is merely intended to be illustrative and not limiting. For example, in other embodiments, a cache line 30 may be allocated with a line width that enables storage of a single valid data object 134 or more than two valid data objects 134.

In any case, as described above with reference to FIG. 11, a data object 134 may include a data block 102 and metadata 136. For example, as described above, the metadata 136 may include a validity parameter 140, which is indicative of whether the data block 102 and, thus, the data object 134 is valid. Additionally, as described above, in some embodiments, the metadata 136 may include one or more context parameters 142, which indicate context information associated with the data block 102. For example the context parameter 142 may include a processor context parameter 142, a processor core context parameter 142, an application (e.g., program or thread) context parameter 142, an application instruction (e.g., program counter) context parameter 142, or any combination thereof.

Furthermore, as described above, in some embodiments, the metadata 136 may include a tag parameter 138, which is indicative of storage location of the data block 102 and/or the data object 134 in an address space. For example, a tag parameter 138 associated with a data block 102 may be determined based at least in part on a virtual memory address used by processing circuitry 16 to identify the data block 102 and/or a physical memory address at which the data block is stored or is to be stored in a memory array 28. As such, in some embodiments, the tag parameter 138 may be used to identify the data block 102 and/or the data object 134.

In fact, in some embodiments, a memory sub-system 14 may search for a data block 102 targeted by a read memory access request 98 based at least in part on a target value of a tag parameter 138 expected to be associated with the data block 102. For example, the memory sub-system 14 may determine the target value of the tag parameter 138 expected to be associated with a target data block 102 based at least in part on a virtual memory address and/or a physical memory address indicated in the read memory access request 98. Based at least in part on the target value, the memory sub-system 14 may determine whether the target data block 102 results in a cache miss by searching tag parameter 138 associated with valid data blocks 102 currently stored in a cache 144.

For example, the memory sub-system 14 may determine that the target data block 102 is currently stored in a cache 144 when the target tag parameter 138 matches the tag parameter 138 associated with a valid data block 102 stored therein and, thus, results in a cache hit. On the other hand, the memory sub-system 14 may determine that the target data block 102 is not currently stored in a cache 144 when the target tag parameter 138 does not match tag parameters 138 associated with any valid data block 102 stored therein and, thus, results in a cache miss. Accordingly, on average, data retrieval latency provided by a cache 144 may vary with its storage capacity, for example, due to increasing storage capacity enabling more valid data objects 134 to be stored therein.

In fact, to facilitate improving data retrieval latency, in some embodiments, different caches 144 may be used to implement different hierarchical memory (e.g., cache) levels with varying storage capacities. For example, different memory levels may be implemented with differing number of cache lines 30. As an illustrative example, a cache 144 used to provide a lower memory level may be implemented with fewer cache lines 30 compared to a cache 144 used to provide a higher memory level. Additionally or alternatively, line width of a cache line 30 implemented in a lower memory level may be allocated to enable storage of fewer valid data objects 134 compared to a cache line 30 implemented in a higher memory level. In any case, in this manner, a cache 144 (e.g., memory-side cache 26 and/or processor-side cache 24) may be implemented to provide storage locations organized into one or more cache lines 30.

In fact, returning to the memory sub-system 14A of FIG. 9, in some embodiments, the memory-side caches 26A may be hierarchically organized. For example, the memory-side caches 26A may include one or more memory channel caches 146 and a shared memory-side cache 148. In some embodiments, a memory channel cache 146 may be dedicated to a corresponding memory channel while the shared memory-side cache 148 may be shared between multiple memory channels. For example, a first one or more memory channel caches 146A may be dedicated to a first memory channel implemented by the first memory channel memory array 116A while an Mth one or more memory channel caches 146M may be dedicated to an Mth memory channel implemented by the Mth memory channel memory array 116M. On the other hand, a shared memory-side cache 148 may be shared at least by the first memory channel and the Mth memory channel. Thus, in some embodiments, the shared memory-side cache 148 may be implemented to provide a lower (e.g., lowest) memory (e.g., cache) level in the memory sub-system 14A compared to the memory channel caches 146.

In any case, as described above, the memory-side memory controller 34B may generally control data storage in the memory sub-system 14A. For example, the memory-side memory controller 34B may control whether data is stored in a memory-side cache 26, a volatile memory device 18, a non-volatile memory device 18, or any combination thereof. In other words, in some embodiments, the memory-side memory controller 34B may control whether the data is stored in a (e.g., lower intermediate) memory level implemented in the memory-side cache 26, a (e.g., higher intermediate) memory level implemented in a volatile memory device 18, a (e.g., highest) memory level implemented in a non-volatile memory device 18, or any combination thereof. Thus, as in the depicted example, the memory-side memory controller 34B may be communicatively coupled to the memory-side caches 26A, the memory-side pre-fetch buffer 31B, and/or the memory devices 18A via one or more memory-side internal buses 20D, for example, to enable the memory-side memory controller 34B to search for target data and/or to output control (e.g., command) signals that instruct (e.g., cause) the memory sub-system 14A to adjust data storage therein.

Additionally, as described above, a memory sub-system 14 may provide memory access to a processing sub-system 12 in response to receipt of a memory access request 98 via a memory interface. For example, in response to receipt of a write memory access request 98, the memory-side memory controller 34B may instruct the memory sub-system 14A to store an instance of a data block 102 indicated in the write memory access request 98 in one or more memory levels of the memory sub-system 14A. Additionally or alternatively, in response to receipt of a read memory access request 98, the memory-side memory controller 34B may identify a data block 102 targeted by the read memory access request 98 and instruct the memory sub-system 14A to return the target data block 102 via the memory interface.

Thus, as in the depicted example, a memory-side bus interface 32B may be coupled between the memory bus 20B and the one or more memory-side internal buses 20D. Additionally, as in the depicted example, the memory-side bus interface 32B may include one or more pins 44. As will be described in more detail below, in some embodiments, each pin 44 of a bus interface 32 may be coupled to a corresponding wire in the memory bus 20B. By implementing a memory sub-system 14 in this manner, a memory-side memory controller 34B may be operated to control data storage in the memory sub-system 14, for example, predictively during operation of a corresponding computing system 10 based at least in part on memory-side historical data access information 39B.

Figure 13:
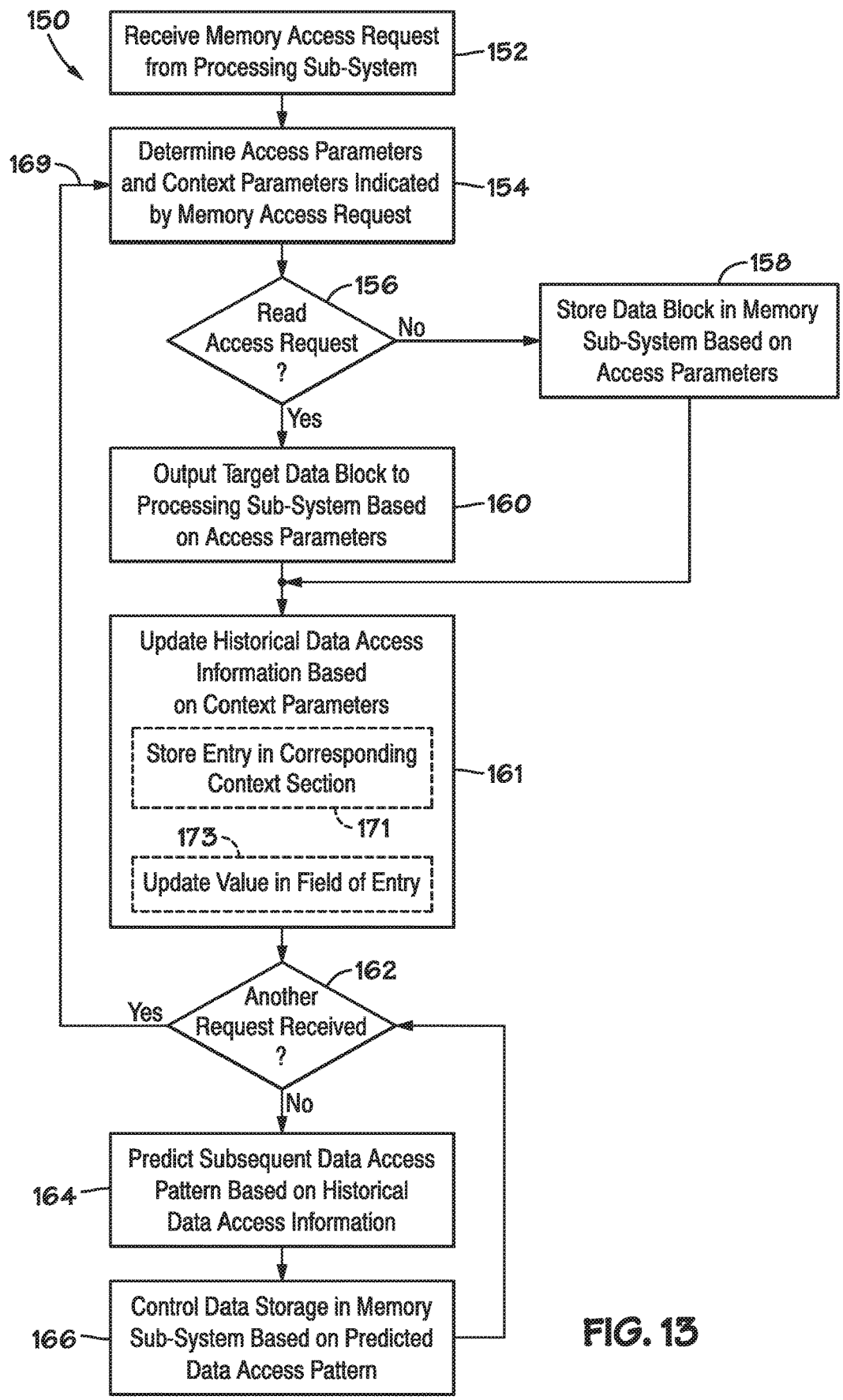
FIG. 13 is a flow diagram of an example process for operating the memory-subsystem of FIG. 9, in accordance with an embodiment of the present disclosure.

To help further illustrate, an example of a process 150 for operating a memory sub-system 14 is described in FIG. 13. Generally, the process 150 includes receiving a memory access request from a processing sub-system (process block 152), determining access parameters and context parameters indicated by the memory access request (process block 154), and determining whether the memory access request is a read access request (decision block 156). Additionally, the process 150 includes storing a data block in a memory sub-system based on the access parameters when the memory access request is not a read access request (process block 158), outputting a target data block to the processing sub-system based on the access parameters when the memory access request is a read access request (process block 160), updating historical data access information based on the context parameters (process block 161), and determining whether another memory access request has been received (decision block 162). When another memory access request has not yet been received, the process 150 includes predicting a subsequent data access pattern based on the context parameters (process block 164) and controlling data storage in the memory sub-system based on the predicted data access pattern (process block 166).

Although described in a particular order, which represents a particular embodiment, it should be noted that the process 150 may be performed in any suitable order. Additionally, embodiments of the process 150 may omit process blocks and/or include additional process blocks. Moreover, in some embodiments, the process 150 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a memory-side memory controller 34B implemented in a memory sub-system 14 of a computing system 10 may determine a memory access request 98 output from a processing sub-system 12 in the computing system 10 to the memory sub-system 14 (process block 152). As described above, in some embodiments, a processing sub-system 12 may output a memory access request 98 via a memory bus 20B. Additionally, as described above, in some embodiments, a memory sub-system 14 may include a memory-side bus interface 32B, which is coupled between the memory bus 20B and one or more memory-side internal buses 20D. As such, in some embodiments, the memory-side bus interface 32 may receive a memory access request 98 output from the processing sub-system 12 via the memory bus 20B and route the memory access request 98 to the memory-side memory controller 34B via one or more memory-side internal buses 20D.

Additionally, the memory-side memory controller 34B may determine one or more access parameters and one or more context parameters 142 indicated by the memory access request 98 (process block 154). As described above, in some embodiments, a memory access request 98 may include one or more parameter fields 100, which may each be used to indicate the value of a corresponding (e.g., access or context) parameter. Additionally, as described above, in some embodiments, a communication protocol associated with a memory interface implemented in the computing system 10 may govern formatting of memory access requests 98. For example, the communication protocol may govern the number and/or type of parameters to be included in memory access requests 98. Additionally or alternatively, the communication protocol may govern bit allocation for indicating parameter fields 100 in memory access requests 98.

Thus, in some embodiments, the memory-side memory controller 34B may determine the value of one or more context parameter 142 by parsing the memory access request 98 in accordance with the communication protocol of the memory interface. For example, the memory-side memory controller 34B may determine the value of a processor context parameter 142 by reading one or more bits allocated by the communication protocol for indicating a processor context parameter field 106 in the memory access request 98. Additionally or alternatively, the memory-side memory controller 34B may determine the value a processor core context parameter 142 by reading one or more bits allocated by the communication protocol for indicating a processor core context parameter field 106 in the memory access request 98, the value of an application (e.g., program or thread) context parameter 142 by reading one or more bits allocated by the communication protocol for indicating an application context parameter field 106 in the memory access request 98, the value of an application instruction (e.g., program counter) context parameter 142 by reading one or more bits allocated by the communication protocol for indicating an application instruction context parameter field 106 in the memory access request 98, or any combination thereof.

As described above, in some embodiments, one or more context parameters 142 may be hashed before inclusion in a memory access request 98 as a hashed context parameter 142. Thus, at least in such embodiments, the memory-side memory controller 34B may determine an indication of one or more context parameters 142 by reading one or more bits allocated by the communication protocol for indicating a hashed context parameter field 106 in the memory access request 98. Additionally, to facilitate proper interpretation by the memory sub-system 14, in some embodiments, a memory access request 98 may include a hash function context parameter 142 that identifies the hash function used to generate the hashed context parameter 142.

Similarly, in some embodiments, the memory-side memory controller 34B may determine one or more access parameters by parsing the memory access request 98 in accordance with the communication protocol of the memory interface. For example, the memory-side memory controller 34B may determine the value of a memory address access parameter by reading one or more bits allocated by the communication protocol for indicating a memory address access parameter field 104 in the memory access request 98. Additionally, the memory-side memory controller 34B may determine the value of an access type access parameter by reading one or more bits allocated by the communication protocol for indicating an access type access parameter field 104 in the memory access request 98.

Based at least in part on the access type access parameter, the memory-side memory controller 34B may determine whether the memory access request 98 is requesting read access (decision block 156). For example, when the access type access parameter is not set (e.g., low or "0-bit"), the memory-side memory controller 34B may determine that read access is being requested and, thus, that the memory access request 98 received from the processing sub-system 12 is a read memory access request 98. On the other hand, when the access type access parameter is set (e.g., high or "1-bit"), the memory-side memory controller 34B may determine that write access is being requested by the memory access request 98 received from the processing sub-system 12. In other words, when the access type access parameter is set, the memory-side memory controller 34B may determine that the memory access request 98 is a write memory access request 98 and, thus, is not requesting read access.

In response to receipt of a write memory access request 98, the memory-side memory controller 34B may instruct the memory sub-system 14 to store a data block 102 indicated by the write memory access request 98 in one or more memory levels (process block 158). As described above, in some embodiments, a data block 102 and one or more context parameters 142 associated with the data block 102 may be stored together as a data object 134. Additionally, as described above, in some embodiments, a memory address access parameter indicated in a write memory access request 98 may identify a (e.g., physical) memory address at which to store a corresponding data block 102. In other words, in response to receipt of a write memory access request 98, the memory-side memory controller 34B may instruct the memory sub-system 14 to store an instance of the data block 102 at the memory address identified by its memory address access parameter. In some embodiments, the memory-side memory controller 34B may additionally instruct the memory sub-system 14 to store an instance of the data block 102 in one or more other (e.g., lower) memory levels, for example, to facilitate reducing data retrieval latency when the memory address identified by the write memory access request 98 is in a higher (e.g., memory channel and/or storage) memory level.

On the other hand, in response to receipt of a read memory access request 98, the memory-side memory controller 34B may identify a data block 102 targeted by the read memory access request 98 and instruct the memory sub-system 14 to return the target data block 102 to the processing sub-system 12 (process block 160). As described above, in some embodiments, a memory sub-system 14 may include one or more memory-side caches 26 used to implement a lower memory level compared to a memory array 28 implemented in one or more memory devices 18 of the memory sub-system 14. Accordingly, when the memory sub-system 14 includes a memory-side cache 26, the memory-side memory controller 34B may determine whether the target data block 102 is currently stored in the memory-side cache 26 and, thus, whether the target data results in a memory-side cache miss. For example, the memory-side memory controller 34B may search tag parameters 138 associated with valid data blocks 102 currently stored in the memory-side cache 26 based at least in part on a target value of a tag parameter 138 expected to be associated with the target data block 102. In particular, when the target value of the tag parameter 138 is included in the memory-side cache 26, the memory-side memory controller 34B may determine that the target data block 102 does not result in a memory-side cache miss and, thus, instruct the memory-side cache 26 to output the target data block 102.

When the target data block 102 results in a memory-side cache miss or the memory sub-system 14 does not include memory-side caches 26, the memory-side memory controller 34B may locate the target data block 102 in a memory array 28 implemented in one or more memory devices 18 and instruct the memory array 28 to output the target data block 102. For example, the memory-side memory controller 34B may instruct row select circuitry 118 to activate a memory cell row 130 of a memory array 28 in which the target data block 102 is stored. In some embodiments, the row select circuitry 118 may activate the memory cell row 130 identified by a row address associated with the target data block 102. Additionally, in some embodiments, the row select circuitry 118 may activate the memory cell row 130 by outputting an activation (e.g., logic high) signal to a word line 124 coupled to the memory cells 122 of the memory cell row 130. Furthermore, in some embodiments, column select circuitry 120 may read the target data block 102 from the activated memory cell row 130 by selecting amplifier circuitry 126 coupled to a memory cell column 132 identified by a column address associated with the target data block 102. Additionally or alternatively, the column select circuitry 120 may mux outputs from each memory cell columns 132 based on the column address associated with the target data block 102.

As described above, in some embodiments, a data block 102 retrieved from a memory level in a memory sub-system 14 may be returned (e.g., output) to a processing sub-system 12 via a memory-side bus interface 32B. In other words, at least in such embodiments, the memory-side memory controller 34B may instruct the memory-side bus interface 32B to output the data block 102 via a memory bus 20B coupled between the processing sub-system 12 and the memory sub-system 14. Additionally, to facilitate improving subsequent data retrieval latency, in some embodiments, a memory sub-system 14 may store an instance (e.g., copy) of a target data block 102 retrieved from a higher memory level in one or more lower memory (e.g., cache) levels. For example, when the target data block is retrieved from a memory array 28, the memory-side memory controller 34B may instruct the memory sub-system 14 to store an instance of the target data block 102 in one or more memory-side cache 26. Additionally or alternatively, when the target data block 102 is returned from the memory sub-system 14, a processor-side memory controller 34A may instruct the processing sub-system 12 to store an instance of the target data block 102 in one or more processor-side caches 24.

In any case, to facilitate predictively controlling data storage in the memory sub-system 14, the memory-side memory controller 34B may update its memory-side historical data access information 39B based at least in part on the context parameters 142 indicated in the memory access request 98. As described above, in some embodiments, historical data access information 39 associated with a data block 102 may be indicated via one or more corresponding entries 71 in a historical data access information table 69. Additionally, as described above, in some embodiments, a historical data access information table 69 may be organized such that entries 71 corresponding with different transaction contexts are indicated in different table sections 81.

Accordingly, in some embodiments, the memory-side memory controller 34B may update the memory-side historical data access information 39B at least in part by adding an entry 71 to a table section 81 corresponding with a transaction context indicated by the context parameters 142 (process block 171). For example, when the memory access request 98 is a write memory access request 98, the memory-side memory controller 34B may add an entry 71 that identifies the data block 102 received for storage in the memory sub-system 14 via a block identifier parameter in its block identifier field 73. On the other hand, when the memory access request 98 is a read memory access request 98, the memory-side memory controller 34B may add an entry 71 that identifies the data block 102 targeted for return from the memory sub-system 14 via a block identifier parameter indicated in its block identifier field 73. In some embodiments, the entry 71 may be added to a table section 81 such that the entry 71 is indicated in chronological order relative to one or more other entries 71 associated with the same transaction context.

In addition to a block identifier field 73, as described above, in some embodiments, an entry 71 in a historical data access information table 69 may include a write time field 75, a last access time field 77, and/or an access count field 79. Accordingly, in some embodiments, the memory-side memory controller 34B may update the memory-side historical data access information 39B at least in part by updating the value of one or more fields included in an entry 71 of its historical data access information table 69 (process block 173). For example, when the memory access request 98 is a read memory access request 98, the memory-side memory controller 34B may update the value of a last access time parameter in its last access time field 77 to indicate a current time and/or increment the value an access count parameter in its access count field 79. On the other hand, when the memory access request 98 is a write memory access request 98, the memory-side memory controller 34B may indicate a current time via a write time parameter in its write time field 75.

After fulfilling the memory access request 98, the memory-side memory controller 34B may determine whether another memory access request 98 has been received from the processing sub-system 12 (decision block 162). When another memory access request 98 has already been received, the memory controller again determines one or more access parameters indicated in the other memory access request 98, determine one or more context parameters 142 indicated in the other memory access request 98, and so on (arrow 169). On the other hand, when another memory access request 98 has not yet been received, the memory-side memory controller 34B may take the opportunity to predictively adjust data storage in the memory sub-system 14, for example, to facilitate improving (e.g., reducing) subsequent data retrieval latency provided by the memory sub-system 14 and, thus, computing system operational efficiency.

In particular, when another memory access request 98 has not yet been received, the memory-side memory controller 34B may predict a data access pattern expected to occur during an upcoming control horizon (e.g., time period or one or more clock cycles) based at least in part on the memory-side historical data access information 39B. In other words, the memory-side memory controller 34B may predict what data will be targeted during the upcoming control horizon, when the data will be targeted during the upcoming control horizon, and/or an order with which the data will be targeted during the upcoming control horizon. In fact, since context information is used for prediction in the processing sub-system 12, in some embodiments, the memory-side memory controller 34B in the memory sub-system 14 may predict one or more subsequent data access patterns in an analogous manner.

In other words, in some embodiments, the memory-side memory controller 34B may predict a subsequent data access pattern by analyzing memory-side historical data access information 39B in view of transaction context, for example, indicated via one or more context parameters 142 included in a memory access request 98 received from the processing sub-system 12 and/or in a data object 134 along with a corresponding data block 102. However, at least in some embodiments, historical data access information 39 available to a memory sub-system 14 and a corresponding processing sub-system 12 may differ, for example, due to one or more targeted data blocks 102 being accessed from a processor-side cache 24 and, thus, not being accessed in the memory sub-system 14. In other words, at least in such embodiments, the memory-side historical data access information 39B and the processor-side historical data access information 39A may differ, thereby result in a subsequent data access pattern predicted by the memory sub-system 14 differing from the subsequent data access pattern predicted by the processing sub-system 12, for example, even when they implement analogous prediction techniques.

To facilitate improving computing system operational efficiency, the memory-side memory controller 34B may predictively control data storage in the memory sub-system 14 based at least in part on the predicted data access pattern (process block 166). In particular, in some embodiments, the memory-side memory controller 34B may control what data blocks are stored in a memory level based at least in part on a predicted access order of the data blocks and/or a next predicted target time of the data blocks. For example, the memory-side memory controller 34B may pre-fetch a copy of a data block 102 expected to be targeted during an upcoming control horizon from the storage memory array 114 to a memory channel memory array 116 and/or from a memory channel memory array 116 to a memory-side cache 26 or a memory-side pre-fetch buffer 31B before the data block 102 is actually targeted. Additionally or alternatively, the memory-side memory controller 34B may instruct a memory-side cache 26 and/or a memory channel memory array 116 to evict a data block 102, for example, when the data block is not expected to be targeted during an upcoming control horizon to make room for another data block 102 that is expected to be targeted during the upcoming control horizon. In this manner, a memory-side memory controller 34B may operate to predictively control data storage in one or more memory levels implemented in a memory sub-system 14 based at least in part on context information.

As described above, to facilitate consideration by a memory sub-system 14, in some embodiments, context information may be indicated in memory access requests 98 output from a corresponding processing sub-system 12 via a memory interface, for example, which includes software that facilitates formatting the memory access request 98 in accordance with a communication protocol of the memory interface and/or hardware (e.g., bus-interface pins 44 and memory bus 20B) that enables communication between the processing sub-system 12 and the memory sub-system 14. However, as described above, at least in some embodiments, including context information in memory access requests 98 may result in an increase in the number of bits per memory access requests 98, for example, due to the addition of one or more context parameter fields 106 in the memory access request 98. As described above, to facilitate accommodating memory access requests 98 including one or more context parameter fields 106 and/or a resulting increase in the number of bits per memory access request 98, in some embodiments, implementation of the memory interface deployed in the computing system 10 may be adjusted.

Figure 14:
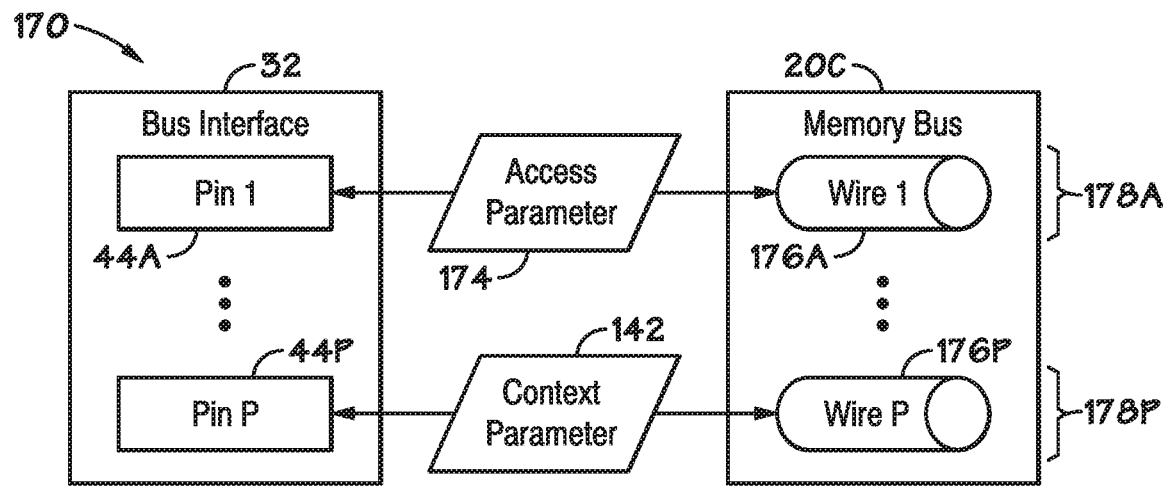
FIG. 14 is a block diagram of an example memory bus and memory bus interface implemented in the computing system of FIG. 1, in accordance with an embodiment of the present disclosure.

To help further illustrate, an example of a memory interface 170, which may be deployed in a computing system 10, is shown in FIG. 14. As in the depicted example, the memory interface 170 may include a bus interface 32 and a memory bus 20B, which is coupled to the bus interface 32. Thus, in some embodiments, the memory interface 170 may be bus-based interface, such as a double data rate (DDR) interface, a graphics double data rate (GDDR) interface, a high bandwidth memory (HBM) interface, or the like.

However, it should be appreciated that the depicted example is merely intended to be illustrative and not limiting. For example, in other embodiments, the memory interface 170 may be a packetized interface, such as a hybrid memory cube (HMC) interface, a Gen-Z interface, or the like. Moreover, the memory interface 170 may additionally include another bus interface 32 coupled to an opposite end (e.g., side) of the memory bus 20B.

In some embodiments, the bus interface 32 may be implemented in a processing sub-system 12 as a processor-side bus interface 32A. In other embodiments, the bus interface 32 may be implemented in a memory sub-system 14 as a memory-side bus interface 32B. In any case, as described above, a bus interface 32 may include one or more pins 44 that may be coupled to a memory bus 20B. For example, the bus interface 32 may include a first pin 44A and a Pth pin 44P.

Additionally, as described above, a memory bus 20B may include one or more wires 176 (e.g., conductive paths or traces). In fact, in some embodiments, each wire 176 of the memory bus 20B may be coupled to a corresponding pin 44 in the bus interface 32. To help illustrate, in the depicted example, the memory bus 20B includes a first wire 176, which may be coupled to the first pin 44A of the bus interface 32. The memory bus 20B also includes a Pth wire 176P, which may be coupled to the Pth pin 44P of the bus interface 32.

In other words, in some embodiments, the memory interface 170 may include multiple (e.g., parallel) data paths 178, for example, which each includes a set (e.g., pair) of bus interface pins 44 and a memory bus wire 176 coupled therebetween. As an illustrative example, a first data path 178A in the memory interface 170 may include the first pin 44A of the bus interface 32 and the first wire 176A of the memory bus 20B. Similarly, a Pth data path 178P in the memory interface 170 may include the Pth pin 44P of the bus interface 32 and the Pth wire 176P of the memory bus 20B. Although not depicted, the first data path 178A may additionally include a pin 44 of another bus interface 32 (e.g., deployed in a different computing sub-system) and the Pth data path 178P may additionally include another pin 44 of the other bus interface 32.

Moreover, during communication of a memory access request 98, in some embodiments, different data paths 178 in the memory interface 170 may be dedicated to communication of different parameter fields 100 in the memory access request 98. For example, the first data path 178A may be implemented to communicate the value of an access parameter 174 indicated in an access parameter field 104 of the memory access request 98. On the other hand, the Pth data path 178P may be implemented to communicate the value of a context parameter 142 indicated in a context parameter field 106 of the memory access request 98.

In other words, in other embodiments that do not include the context parameter field 106 in memory access requests 98, the Pth data path 178P may be obviated and, thus, not included in the memory interface 170, for example, to facilitate reducing implementation associated cost, such as physical footprint and/or component count, of the memory interface 170. That is, in embodiments that include the context parameter field 106 in memory access request 98, the Pth data path 178P may be added to the memory interface 170.

As described above, in some embodiments, adjusting a memory interface 170 to include one or more additional data paths 178 may facilitate increasing its (e.g., maximum) communication bandwidth. In other words, to facilitate accommodating memory access requests 98 that include one or more context parameter fields 106, in some embodiments, the memory interface 170 may be implemented to provide a higher communication bandwidth, for example, compared to embodiments that do not include context parameter fields 106 in memory access requests 98. As described above, at least in some instances, increasing the communication bandwidth provided by the memory interface 170 may facilitate improving computing system operational efficiency, for example, by enabling the access parameter 174 and the context parameter 142 to be concurrently communicated at least in part during the same one or more clock cycles.

However, as described above, the number of data paths 178 implemented in a memory interface 170 may affect its implementation associated cost. For example, adding a pin 44 to a bus interface 32 may increase the physical footprint and/or the component count of the bus interface 32 and, thus, a memory interface 170 in which the bus interface 32 is deployed. Similarly, adding a wire 176 to a memory bus 20B may increase the physical footprint and/or the component count of the memory bus 20B and, thus, a memory interface 170 in which the memory bus 20B is deployed. As described above, to facilitate accommodating memory access requests 98 that include one or more context parameter fields 106 while reducing the effect on implementation associated cost, in some embodiments, the communication protocol used to communicate via the memory interface 170 may be adjusted.

Figure 15:
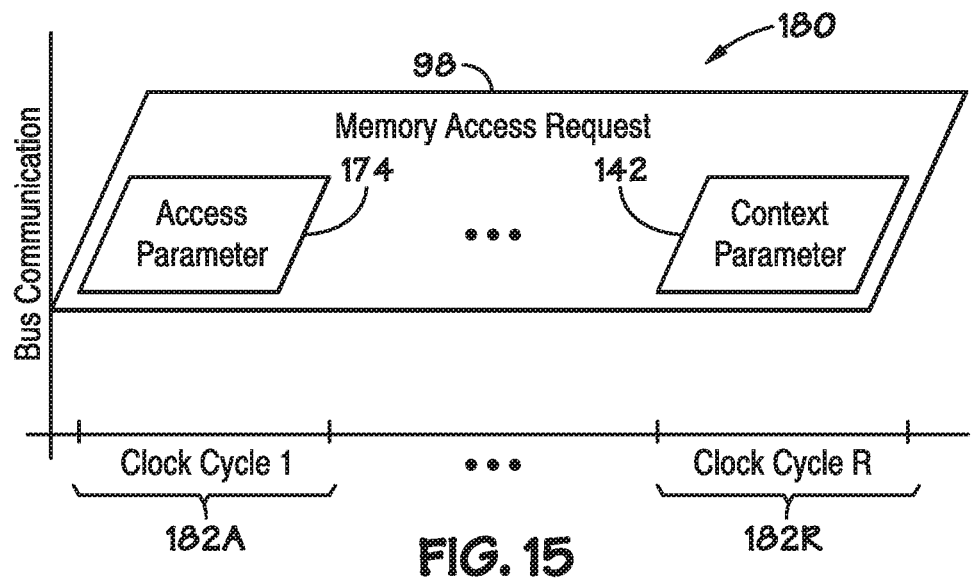
FIG. 15 is a timing diagram of example communication between the processing sub-system and the memory sub-system of FIG. 1, in accordance with an embodiment of the present disclosure.

To help illustrate, an example timing diagram 180 describing communication over a memory bus 20, which may be implemented in a memory interface 170, is shown in FIG. 15. In particular, the timing diagram 180 describes communication timing (e.g., formatting) of a memory access request 98 over multiple clock cycles 182, which include at least a first clock cycle 182A and an Rth clock cycle 182R. However, it should be appreciated that the depicted example is merely intended to be illustrative and not limiting. In particular, in other embodiments, a memory access request 98 may be communicated over a single clock cycle 182, for example, when communication bandwidth of the memory interface 170 is expanded to enable concurrent (e.g., parallel) communication of each parameter field 100 in the memory access request 98.

As described above, in some embodiments, different parameter fields 100 in a memory access request 98 may be communicated (e.g., transmitted and/or received) during different clock cycles 182. To help illustrate, as in the depicted example, the value of an access parameter 174 indicated in an access parameter field 104 of the memory access request 98 may be communicated during the first clock cycle 182A. On the other hand, the value of a context parameter 142 indicated in a context parameter field 106 of the memory access request 98 may be communicated during the Rth clock cycle 182R.

In other words, in other embodiments that do not include the context parameter field 106 in memory access requests 98, communication of the memory access request 98 may be completed before reaching the Rth clock cycle 182R. That is, at least in such instances, communication of the memory access request 98 during the Rth clock cycle 182R may be obviated and, thus, not performed, for example, to facilitate improving computing system operational efficiency.

As described above, in some embodiments, timing and/or formatting of communications via a memory interface 170 may be governed by a communication protocol. For example, the communication protocol may govern what parameter fields 100 are communicated during each clock cycle 182. Additionally or alternatively, the communication protocol may govern the number of clock cycles 182 allocated for communication of each memory access request 98.

In other words, in embodiments that include the context parameter field 106 in memory access request 98, the communication protocol may be adjusted to additionally allocate the Rth clock cycle 182R for communication of the memory access request 98. That is, to facilitate accommodating memory access requests 98 that include one or more context parameter fields 106, the communication protocol to be used to communicate via the memory interface 170 may be adjusted to increase the number of clock cycles 182 during which each memory access request 98 is communicated, for example, compared to embodiments that do not include context parameter fields 106 in memory access requests 98. As described above, at least in some instances, increasing the number of clock cycles 182 allocated for communication of a memory access request 98 may facilitate reducing implementation associated cost, for example, by obviating inclusion of one or more data paths 178 in the memory interface 170.

However, as described above, the number of clock cycles 182 used to communicate a memory access request 98 from a processing sub-system 12 to a memory sub-system 14 may affect computing system operational efficiency. In particular, in some embodiments, the memory sub-system 14 may wait for a memory access request 98 to be completely received before acting on the memory access request 98. As such, in some embodiments, setting the communication protocol to increase the number of clock cycles 182 during which memory access requests 98 are communicated may delay response by the memory sub-system 14 and, thus, affect (e.g., reduce) computing system operational efficiency.

In other words, in some embodiments, different adjustments to a memory interface 170 may present varying tradeoffs between operational efficiency and implementation associated cost. To facilitate balancing (e.g., optimizing) the tradeoffs, in some embodiments, the communication bandwidth and the communication protocol of the memory interface 170 may both be adjusted. For example, to facilitate accommodating memory access requests 98 that include one or more context parameter fields 106, the number of data paths 178 implemented in the memory interface 170 and the number of clock cycles 182 allocated per memory access request 98 may both be increased. In this manner, the techniques described in the present disclosure may facilitate communication of context information associated with data accesses from a processing sub-system 12 to a memory sub-system 14, which, at least in some instances, may facilitate improving computing system operational efficiency, for example, by enabling the memory sub-system 14 to predictively control data storage based at least in part on the context information available to the processing sub-system 12.

One or more specific embodiments of the present disclosure are described herein and depicted in the corresponding figures. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An apparatus comprising a processing system configured to be communicatively coupled to a memory system via a memory bus, wherein the processing system comprises:
   processing circuitry configured to perform data processing operations;
   one or more processor-side caches configured to provide data storage via a first one or more hierarchical memory levels; and
   a processor-side memory controller, wherein, when a first data block targeted by the processing circuitry results in a processor-side miss, the processor-side memory controller is configured to instruct the processing system to output a first memory access request that requests return of the first data block at least in part by:
      outputting a first access parameter to be used by the memory system to locate the first data block in a second one or more hierarchical memory levels implemented in the memory system to the memory bus during a first clock cycle; and
      outputting a first context parameter indicative of first context information associated with current targeting of the first data block to the memory bus during a second clock cycle different from the first clock cycle to enable the memory system to predictively control data storage in the second one or more hierarchical memory levels based at least in part on the first context information; and
   wherein the second one or more hierarchical memory levels in the memory system comprise a lower memory level and a higher memory level; and
   the memory system comprises a memory-side memory controller configured to:
      predict that a second data block stored in the higher memory level will be a next target data block based at least in part on the first context information indicated via the first context parameter in the first memory access request; and
      instruct the memory system to pre-fetch the second data block from the higher memory level such that a copy of the second data block is stored in the lower memory level before the next target data block is expected to be targeted.

2. The apparatus of claim 1, wherein, when the first data block targeted by the processing circuitry results in a processor-side miss, the processor-side memory controller is configured to:
   determine the first access parameter to indicate a virtual memory address used by the processing circuitry to identify the first data block, a physical memory address at which the first data block is stored in the memory system, or both; and
   determine the first context parameter to identify a processor in the processing circuitry that is currently targeting the first data block, a processor core in the processing circuitry that is currently targeting the first data block, an application running in the processing circuitry that resulted in the first data block currently being targeted, an application instruction that, when executed by the processing circuitry, resulted in in the first data block currently being targeted, or any combination thereof.

3. The apparatus of claim 1, wherein:
   the processor-side memory controller is configured predictively control data storage in the first one or more hierarchical memory levels of the processing system based at least in part on the first context information associated with the current targeting of the first data block and first historical data access information available in the processing system; and
   the memory system comprises a memory-side memory controller configured to predictively control data storage in the second one or more hierarchical memory levels of the memory system based at least in part on the first context information indicated in the first memory access request and second historical data access information available in the memory system, wherein the second historical data access information available in the memory system differs from the first historical data access information available in the processing system when one or more data blocks previously targeted by the processing circuitry resulted in a processor-side hit.

4. The apparatus of claim 1, wherein the second clock cycle during which the first context parameter of the first memory access request is output to the memory bus occurs after the first clock cycle during which the first access parameter of the first memory access request is output to the memory bus.

5. The apparatus of claim 1, wherein, when the first data block targeted by the processing circuitry results in a processor-side miss, the processor-side memory controller is configured to:
   determine a hashed context parameter value at least in part by performing a hash function on the first context parameter; and
   instruct the processing system to:
      output the hashed context parameter value to the memory bus during the second clock cycle; and
      output a second context parameter that identifies the hash function used by the processor-side memory controller to generate the hashed context parameter value to enable the memory system to track context information in accordance with the hash function.

6. The apparatus of claim 5, wherein, when the first data block targeted by the processing circuitry results in a processor-side miss, the processor-side memory controller is configured to:
   determine the first context parameter to identify a processor in the processing circuitry that is currently targeting the first data block, a processor core in the processing circuitry that is currently targeting the first data block, or both;
   determine a third context parameter identifying an application running in the processing circuitry that resulted in the first data block currently being targeted, an application instruction that, when executed by the processing circuitry, resulted in in the first data block currently being targeted, or both; and determine the hashed context parameter value at least in part by performing the hash function on the first context parameter and the third context parameter.

7. The apparatus of claim 1, wherein the processor-side memory controller is configured to instruct the processing system to output a second memory request that requests storage of the first data block in the memory system at least in part by:
outputting a second access parameter indicative of a target storage location at which the first data block is to be stored in the memory system to the memory bus; and
outputting a second context parameter indicative of second context information associated with generation of the first data block to the memory bus to enable the memory system to predictively control data storage in the second one or more hierarchical memory levels based at least in part on the second context information associated with generation of the first data block and the first context information associated with targeting of the first data block.

8. The apparatus of claim 1, wherein, when a second data block targeted by the processing circuitry results in a processor-side miss, the processor-side memory controller is configured to instruct the processing system to output a second memory access request that requests return of the second data block at least in part by:
outputting a second access parameter to be used by the memory system to locate the second data block in the second one or more hierarchical memory levels to the memory bus during a third clock cycle; and
outputting a second context parameter indicative of second context information associated with current targeting of the second data block to the memory bus during a fourth clock cycle to enable the memory system to predictively control data storage in the second one or more hierarchical memory levels based at least in part on the second context information associated with targeting of the second data block and the first context information associated with targeting of the first data block, wherein:
the fourth clock cycle is different from the third clock cycle; and
the second context parameter is indicative of a different type of context information compared to the first context parameter indicated in the first memory access request.

9. The apparatus of claim 1, wherein:
the processing system comprises a request queue with an expanded entry bit-width that enables storage of memory access requests including one or more context parameter fields; and
when the first data block targeted by the processing circuitry results in a processor-side miss, the processor-side memory controller is configured to:
store the first memory access request in the request queue before output to the memory bus; and
instruct the processing system to output the first memory access request to the memory bus after retrieval from the request queue.

10. The apparatus of claim 1, wherein the memory bus comprises:
a plurality of wires configured to:
communicate the first access parameter during the first clock cycle; and
communicate the first context parameter indicative of the first context information associated with the current targeting of the first data block during the second clock cycle; and
an additional wire configured to:
communicate a second context parameter indicative of second context information associated with the current targeting of the first data block at least in part during the first clock cycle;
communicate the second context parameter indicative of the second context information associated with the current targeting of the first data block at least in part during the second clock cycle; or
both.

11. A method of operating a computing system, comprising:
determining, using memory control circuitry, whether a first data block targeted by processing circuitry in a processing sub-system of the computing system to perform a first data processing operation is currently stored in the processing sub-system; and
in response to determining that the first data block is not currently stored in the processing sub-system:
indicating, using the memory control circuitry, a first memory address associated with the first data block in an access parameter field of a first memory access request;
indicating, using the memory control circuitry, first context information associated with targeting of the first data block by the processing circuitry in a first context parameter field of the first memory access request; and
instructing, using the memory control circuitry, the processing sub-system to supply the first memory access request to a memory sub-system via a memory interface to enable the memory sub-system to:
locate the first data block based at least in part on the first memory address indicated in the access parameter field of the first memory access request;
return the first data block to the processing sub-system via the memory interface to facilitate performance of the first data processing operation; and
control data storage in a plurality of hierarchical memory levels implemented in the memory sub-system based at least in part on the first context information indicated in the first context parameter field of the first memory access request.

12. The method of claim 11, wherein instructing the processing sub-system to supply the first memory access request to the memory sub-system comprises:
instructing the processing sub-system to output the first memory address indicated in the access parameter field to a communication bus of the memory interface at least in part during a first clock cycle; and
instructing the processing sub-system to output the first context information indicated in the first context parameter field to the communication bus of the memory interface at least in part during a second clock cycle different from the first clock cycle.

13. The method of claim 12, comprising, in response to determining that the first data block is not currently stored in the processing sub-system:
indicating, using the memory control circuitry, second context information associated with targeting of the first data block by the processing circuitry in a second context parameter field of the first memory access request, wherein the second context information indicates context associated with targeting of the first data block at a different level of specificity compared to the first context information; and instructing, using the memory control circuitry, the processing sub-system to supply the first memory access request to the memory sub-system via the memory interface to enable the memory sub-system to control data storage in the plurality of hierarchical memory levels based at least in part on the second context information indicated in the second context parameter field of the first memory access request and the first context information indicated in the first context parameter field of the first memory access request.

14. The method of claim 11, comprising:

determining, using the memory control circuitry, whether a second data block targeted by the processing circuitry in the processing sub-system to perform a second data processing operation is currently stored in the processing sub-system; and in response to determining that the second data block is not currently stored in the processing sub-system:
  indicating, using the memory control circuitry, a second memory address associated with the second data block in the access parameter field of a second memory access request;
  indicating, using the memory control circuitry, second context information associated with targeting of the second data block by the processing circuitry in the first context parameter field of the second memory access request, wherein the second context information and the first context information comprise different types of context information; and
  instructing, using the memory control circuitry, the processing sub-system to supply the second memory access request to the memory sub-system via the memory interface to enable the memory sub-system to:
    locate the second data block based at least in part on the second memory address indicated in the access parameter field of the second memory access request;
    return the second data block to the processing sub-system via the memory interface to facilitate performance of the second data processing operation; and
    control data storage in the plurality of hierarchical memory levels implemented in the memory sub-system based at least in part on the second context information indicated in the first context parameter field of the second memory access request.

15. The method of claim 11, comprising:

generating, using the memory control circuitry, a second memory access request that requests storage of the first data block in the memory sub-system, wherein generating the second memory access request comprises:
  indicating the first memory address associated with the first data block in the access parameter field of the second memory access request; and
  indicating second context information associated with generation of the first data block by the processing circuitry in the first context parameter field of the second memory access request; and instructing, using the memory control circuitry, the processing sub-system to supply the first memory access request to the memory sub-system via the memory interface to enable the memory sub-system to:
  store the first data block in one or more hierarchical memory levels of the plurality of hierarchical memory levels implemented in the memory sub-system based at least in part on the first memory address indicated in the access parameter field of the second memory access request; and
  control data storage in the plurality of hierarchical memory levels based at least in part on the second context information indicated in the first context parameter field of the second memory access request and the first context information indicated in the first context parameter field of the first memory access request.

16. The method of claim 11, wherein instructing the processing sub-system to supply the first memory access request to the memory sub-system comprises:

instructing a bus interface implemented in the processing sub-system to output the first memory address indicated in the access parameter field of the first memory access request via a first one or more data paths implemented in the memory interface; and instructing the bus interface to output the first context information indicated in the first context parameter field of the first memory access request via a second one or more data paths implemented in the memory interface to enable the memory interface to concurrently communicate the first context information and the first memory address associated with the first data block.

17. A computing system comprising a processing sub-system, wherein the processing sub-system comprises:

a memory controller configured to generate a memory access request that requests access to a memory sub-system coupled to the processing sub-system via an external communication bus, wherein the memory access request comprises:
  an address parameter field used to indicate a memory address associated with a data block targeted by the memory access request; and
  a context parameter field used to indicate context information used by the memory controller to predictively control data storage in one or more hierarchical memory level implemented in the processing sub-system; and a bus interface coupled to the memory controller via one or more internal communication buses, wherein the bus interface comprises:
  a first one or more pins configured to facilitate transmission of the memory access request to the memory sub-system at least in part by outputting the address parameter field of the memory access request to the external communication bus; and
  a second one or pins configured to facilitate transmission of the memory access request to the memory sub-system at least in part by outputting the context parameter field of the memory access request to the external communication bus.

18. The computing system of claim 17, wherein:

the memory address indicated in the address parameter field of the memory access request comprises a virtual memory address used by processing circuitry in the processing sub-system to identify the data block, a physical memory address at which the first data block is expected to be stored in the memory sub-system, or both; and the context information indicated in the context parameter field of the memory access request identifies a first processor in the processing circuitry that is currently targeting the data block, a second processor in the processing circuitry that generated the data block, a first processor core in the processing circuitry that is currently targeting the data block, a second processor core in the processing circuitry that generated the data block, a first application running in the processing circuitry that resulted in the data block currently being targeted, a second application running in the processing circuitry that resulted in the data block being generated, a first application instruction that, when executed by the processing circuitry, resulted in the data block currently being targeted, a second application instruction that, when executed by the processing circuitry, resulted in generation of data block, or any combination thereof.

19. The computing system of claim 17, wherein:

the first one or more pins are configured to output the address parameter field of the memory access request to the external communication bus during one or more clock cycles; and the second one or pins are configured to concurrently output the context parameter field of the memory access request to the external communication bus during the one or more clock cycles.

* * * * *